United States Patent
Sansom et al.

(10) Patent No.: US 11,438,667 B2
(45) Date of Patent: Sep. 6, 2022

(54) COMMUNICATIONS SYSTEM, APPARATUS AND METHOD

(71) Applicants: Patrick Michael Sansom, London (GB); Ian James Valentine, London (GB)

(72) Inventors: Patrick Michael Sansom, London (GB); Ian James Valentine, London (GB)

(73) Assignee: MPHC LTD, London (GB)

( * ) Notice: Subject to any disclaimer, the term of this patent is extended or adjusted under 35 U.S.C. 154(b) by 0 days.

(21) Appl. No.: 15/208,575

(22) Filed: Jul. 12, 2016

(65) Prior Publication Data

US 2017/0134816 A1    May 11, 2017

Related U.S. Application Data

(63) Continuation of application No. 13/395,647, filed as application No. PCT/GB2010/051464 on Sep. 3, 2010, now abandoned.

(51) Int. Cl.
*H04N 21/482* (2011.01)
*G06F 16/735* (2019.01)
(Continued)

(52) U.S. Cl.
CPC ....... *H04N 21/4821* (2013.01); *G06F 16/735* (2019.01); *G06F 16/7867* (2019.01);
(Continued)

(58) Field of Classification Search
CPC ........... H04N 21/4821; H04N 21/4622; H04N 21/8586; H04N 21/4828; H04N 21/84;
(Continued)

(56) References Cited

U.S. PATENT DOCUMENTS 6,163,316 A    12/2000  Killian
6,312,336 B1   11/2001  Handelman et al.
(Continued)

FOREIGN PATENT DOCUMENTS

CN    1783020      7/2006
CN    101216837    7/2008
(Continued)

OTHER PUBLICATIONS

International Search Report dated Apr. 6, 2011 for PCT/GB10/051464.

*Primary Examiner* — Benjamin R Bruckart
*Assistant Examiner* — Akshay Doshi
(74) *Attorney, Agent, or Firm* — Pillsbury Winthrop Shaw Pittman LLP

(57) ABSTRACT

The present invention relates to a communication system operative to provide a user interface for selecting content from at least a first content domain and a second different content domain, configured to drive a display device to display one or more content item identifiers (184) identifying content items of said first content domain and content item identifiers (192) identifying one or more content items of said second content domain in a common display arrangement (180). The invention also relates to an apparatus and method.

3 Claims, 10 Drawing Sheets

(51) Int. Cl.
 *H04N 21/462*  (2011.01)
 *H04N 21/4722*  (2011.01)
 *H04N 21/485*  (2011.01)
 *H04N 21/84*  (2011.01)
 *G06F 16/78*  (2019.01)
 *H04N 7/173*  (2011.01)
 *H04N 21/436*  (2011.01)
 *H04L 65/1059*  (2022.01)
 *H04N 21/858*  (2011.01)
 *H04L 65/612*  (2022.01)
 *H04N 21/4725*  (2011.01)
 *H04L 65/61*  (2022.01)

(52) U.S. Cl.
 CPC ...... *H04L 65/1059* (2013.01); *H04L 65/4084* (2013.01); *H04N 7/17318* (2013.01); *H04N 21/43615* (2013.01); *H04N 21/4622* (2013.01); *H04N 21/4722* (2013.01); *H04N 21/4725* (2013.01); *H04N 21/485* (2013.01); *H04N 21/4828* (2013.01); *H04N 21/84* (2013.01); *H04N 21/8586* (2013.01); *H04L 65/4069* (2013.01)

(58) Field of Classification Search
 CPC ............. H04N 21/4722; H04N 21/485; H04N 21/4725; H04N 7/17318; H04N 21/43615; G06F 16/735; G06F 16/7867; H04L 65/1059; H04L 65/4084; H04L 65/4069
 See application file for complete search history.

(56) References Cited

U.S. PATENT DOCUMENTS

| | | | |
|---|---|---|---|
| 6,725,460 | B1 | 4/2004 | Nishiyama et al. |
| 6,910,191 | B2 | 6/2005 | Segerberg et al. |
| 7,134,132 | B1 | 11/2006 | Ngo et al. |
| 7,694,321 | B1 | 4/2010 | Neil et al. |
| 8,209,713 | B1 | 6/2012 | Lai et al. |
| 8,239,889 | B2 | 8/2012 | Wong et al. |
| 8,281,255 | B2 | 10/2012 | Kidd |
| 8,352,983 | B1 | 1/2013 | Chane et al. |
| 8,413,183 | B2 | 4/2013 | Kunkel et al. |
| 8,687,128 | B2 | 4/2014 | Stahulak et al. |
| 2002/0060750 | A1 | 5/2002 | Istvan et al. |
| 2002/0156702 | A1 | 10/2002 | Kane |
| 2002/0178444 | A1 | 11/2002 | Trajkovic et al. |
| 2003/0001898 | A1 | 1/2003 | Bernhardson |
| 2003/0115596 | A1 | 6/2003 | Stevens et al. |
| 2003/0021093 | A1 | 11/2003 | Touchet |
| 2004/0158858 | A1 | 8/2004 | Paxton et al. |
| 2004/0189873 | A1 | 9/2004 | Konig et al. |
| 2004/0221310 | A1 | 11/2004 | Herrington et al. |
| 2005/0044260 | A1 | 2/2005 | Abramson et al. |
| 2005/0120368 | A1 | 6/2005 | Goronzy et al. |
| 2005/0135793 | A1 | 6/2005 | Mindrum |
| 2005/0273828 | A1 | 12/2005 | Barton |
| 2005/0278741 | A1 | 12/2005 | Robarts et al. |
| 2006/0031892 | A1 | 2/2006 | Cohen |
| 2006/0048184 | A1 | 3/2006 | Poslinski et al. |
| 2006/0075444 | A1 | 4/2006 | Dillen |
| 2006/0143665 | A1 | 6/2006 | Meek et al. |
| 2006/0218589 | A1 | 9/2006 | Wang et al. |
| 2006/0288389 | A1* | 12/2006 | Deutscher .......... H04N 21/4828 725/88 |
| 2007/0006262 | A1 | 1/2007 | Cleron et al. |
| 2007/0074243 | A1 | 3/2007 | Verhaegh et al. |
| 2007/0010374 | A1 | 5/2007 | Sherman et al. |
| 2007/0169148 | A1 | 7/2007 | Oddo et al. |
| 2007/0188655 | A1 | 8/2007 | Ohta |
| 2008/0005068 | A1 | 1/2008 | Dumais |
| 2008/0022310 | A1 | 1/2008 | Polling et al. |
| 2008/0060027 | A1 | 3/2008 | Yang |
| 2008/0086688 | A1 | 4/2008 | Chandratillake et al. |
| 2008/0092159 | A1 | 4/2008 | Dmitriev et al. |
| 2008/0109362 | A1* | 5/2008 | Fransdonk ............ H04W 4/021 705/51 |
| 2008/0154889 | A1 | 6/2008 | Pfeiffer |
| 2008/0181575 | A1 | 7/2008 | Girard et al. |
| 2008/0184309 | A1 | 7/2008 | Allison |
| 2008/0201748 | A1* | 8/2008 | Hasek ................ H04N 7/17309 725/98 |
| 2008/0229353 | A1 | 9/2008 | Morris et al. |
| 2008/0288461 | A1* | 11/2008 | Glennon ............ H04N 21/4334 |
| 2008/0297669 | A1 | 12/2008 | Zalewski et al. |
| 2008/0307456 | A1 | 12/2008 | Beetcher et al. |
| 2009/0031335 | A1* | 1/2009 | Hendricks .............. H04N 7/163 725/1 |
| 2009/0037279 | A1 | 2/2009 | Chockalingam et al. |
| 2009/0131152 | A1* | 5/2009 | Busse ..................... G07F 17/32 463/23 |
| 2009/0172544 | A1 | 7/2009 | Tsui et al. |
| 2009/0178000 | A1 | 7/2009 | Kwon et al. |
| 2009/0210899 | A1 | 8/2009 | Lawrence-Apfelbaum et al. |
| 2009/0222850 | A1 | 9/2009 | Darnell |
| 2010/0070523 | A1 | 3/2010 | Delgo et al. |
| 2010/0083316 | A1 | 4/2010 | Togashi et al. |
| 2010/0211982 | A1 | 8/2010 | Lee et al. |
| 2010/0238924 | A1 | 9/2010 | Liu |
| 2010/0251304 | A1 | 9/2010 | Donoghue |
| 2010/0257569 | A1 | 10/2010 | O'Hanlon |
| 2010/0299326 | A1* | 11/2010 | Germaise ............ G06F 16/9535 707/728 |
| 2011/0010738 | A1 | 1/2011 | Calsgaard et al. |
| 2011/0219400 | A1 | 9/2011 | Candelore et al. |
| 2012/0284134 | A1 | 11/2012 | Monahan |

FOREIGN PATENT DOCUMENTS

| | | |
|---|---|---|
| CN | 101453622 | 6/2009 |
| EP | 1357734 | 10/2003 |
| EP | 1482735 | 12/2004 |
| EP | 1594317 | 11/2005 |
| EP | 2001223 | 12/2008 |
| EP | 2164247 | 3/2010 |
| EP | 1487212 | 8/2011 |
| GB | 242747 | 4/2006 |
| GB | 2452519 | 11/2009 |
| JP | 2008-124651 | 5/2009 |
| WO | WO 2000/778040 | 12/2000 |
| WO | WO 2001/24047 | 5/2001 |
| WO | WO 2002/39289 | 5/2002 |
| WO | WO 2003/42866 | 5/2003 |
| WO | WO 2004/091187 | 10/2004 |
| WO | WO 2005/026869 | 3/2005 |
| WO | WO 2006/66375 | 6/2006 |
| WO | WO 2007/149754 | 12/2007 |
| WO | WO 2008/007274 | 1/2008 |
| WO | WO 2008/070133 | 6/2008 |
| WO | WO 2008/088510 | 7/2008 |
| WO | WO 2009/117009 | 9/2009 |

* cited by examiner

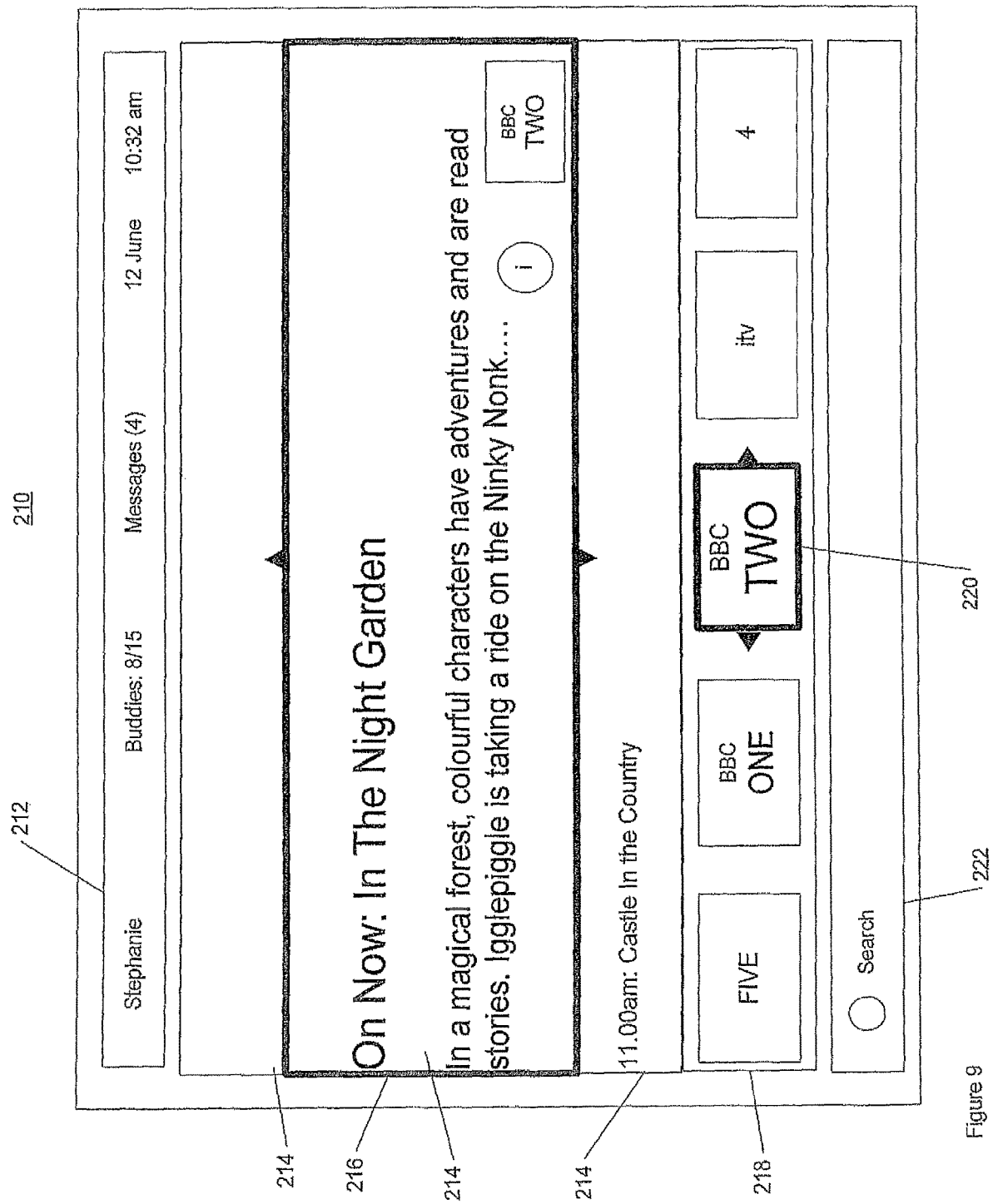

COMMUNICATIONS SYSTEM, APPARATUS AND METHOD

CROSS-REFERENCE TO RELATED APPLICATIONS

The present application is a continuation of U.S. patent application Ser. No. 13/395,647 filed on Sep. 24, 2012, which claims priority to U.S. National Stage Application (filed under 35 U.S.C. 371) of prior International Application No. PCT/GB2010/051464, filed Sep. 3, 2010, and published on Mar. 17, 2011 as WO 2011/030134, which claims priority to GB 0915885.8, GB 0915887.4, and GB 0915886.6, all filed on Sep. 10, 2009, the contents of which are incorporated herein by reference in their entirety.

FIELD

The present invention relates to a communications system, apparatus and method. In particular, but not exclusively, to a communications system comprising a plurality of communications networks.

BACKGROUND

The distribution of media content such as music and video now takes place over various communications channels. For example, music and video may be broadcast over terrestrial VHF and UHF networks to be received by television sets, from satellite to ground stations or domestic satellite receivers and over cable networks. Such broadcast services generally comprise one or more communication channels, each channel comprising a particular carrier frequency onto which is modulated a signal representative of the content to be transmitted over the channel. Content, typically television programmes, films or music shows, are transmitted over a particular channel or channels at particular times in accordance with a programme schedule. In this regard, broadcast services comprise "appointments to view" whereby a viewer has to tune into a channel at the time content of interest to the viewer is transmitted on that channel.

More recently, interactive television has become available whereby a viewer, prompted by a message displayed on the television, may send control signals or messages to the broadcaster or third party associated with the broadcaster and displayed message to initiate certain activity. For example, to initiate selection of a programme to view or receive information about a programme.

Broadcast services are widely available using digital communications techniques. Digital broadcast service providers often provide data to populate a menu or Electronic Programme Guide (EPG) of for example, a set-top box or television with suitable EPG software, on one of their channels. A typical EPG is based on a grid system and displays programmes and channels in transverse directions. For example, the programmes for a particular channel may be displayed in a horizontal direction with different channels set out in a vertical direction. A viewer may use a remote control having "UP/DOWN" and "LEFT/RIGHT" buttons and use these buttons to move a cursor about the display to highlight programmes. A viewer may select a highlighted programme by actuating a "SELECT" button which tunes the receiver to the particular cannel. Optionally, a viewer may highlight a programme which is to be broadcast in the future and selection of that programme may invoke a "record" or "reminder" option.

Television viewers are generally familiar with EPGs set out in a grid system and navigable using remote control devices having relatively simple buttons such as "UP/DOWN" and "LEFT/RIGHT" buttons and "SELECT" buttons.

Content is also available over computer networks such as the Internet. Content is usually accessed over the Internet using a personal computer such as a desktop or laptop computer. The location of content on a network such as the Internet is defined by a network address known as a Uniform Resource Locator (url). A particular content item can be addressed and downloaded to the computer addressing the content for later presentation or may be "streamed" whereby the computer presents the content as it is provided over the network. The user interface for a computer is generally a pointing device such as a "mouse", and computer users are familiar with a user interface which allows for the pointing device to be moved on to an icon, text (such as an Internet "link") or other graphic displayed on a display and selecting that graphic to invoke a function associated with the graphic, for example addressing content over the Internet.

Many communications networks, including those making up at least a part of the Internet, are configured to transmit large amounts of data and these are sometime termed "broadband" networks. For the purpose of this description the term "broadband network" is used refer to a communications network or part thereof which is capable of transmitting content items such as video and music in an acceptable timeframe. Such networks may also support music or video streaming. The data bandwidth capability of a consumer connection to such a network is typically at least 2 MBit/s.

Many computer users have computers which are part of a local area network (LAN), for example in their workplace and increasingly at home in their domestic residence. Users often keep content items on memory storage coupled to their LAN and accessed through their computers.

Aspects and embodiments of the present invention were devised with the foregoing in mind.

SUMMARY

Viewed from a first aspect there is provided a content navigation module operative to provide a user interface for selecting content from at least a first content domain and a second different content domain, configured to drive a display device to display one or more content item identifiers identifying content items of said first content domain and content item identifiers identifying one or more content items of said second content domain in a common display arrangement.

Typically, the first domain is a broadband content domain and the second domain is a broadcast content domain. For example, the broadband content domain may deliver content such as music and video over a communications network such as the Internet, whilst the broadcast domain may be a terrestrial, cable or satellite broadcast system.

The content navigation module may be further configured to drive said display device to display content item identifiers identifying one or more items of a third content domain. The third content domain may comprise a local area network thereby providing a local content domain. The local area network may be a network local to said display device.

In particular, the content navigation module may be further configured to drive said display device to: display in a first region of said display device a first list of said one or more content item identifiers arranged in a first direction;

display a cursor movable in said first direction from a display position of one content item identifier of said first list to a display position of an adjacently displayed content item identifier of said first list responsive to user input; and display in a second region of said display device a second list of one or more content item identifiers associated with a content item identifier of said first list on which said cursor is positioned, wherein said second list is arranged in a second direction transverse to said first direction.

Viewed from a second aspect there is provided a navigation module configured to drive a display device to: display in a first region of said display device a first list of one or more content identifier items identifying respective content items, said first list arranged in a first direction; display a cursor movable in said first direction from a display position of one content identifier item of said first list to a display position of an adjacently displayed content identifier item of said first list responsive to user input; and display in a second region of said display device a second list of one or more content identifier items associated with a content identifier item of said first list on which said cursor is positioned, wherein said second list is arranged in a second direction transverse to said first direction. The first direction may be a vertical direction and the second direction a horizontal direction relative to a viewer perspective and display screen orientation Typically, said first list may comprise one or more content item identifiers and said second list may comprise one or more content item identifiers.

Thus, there may be displayed to a viewer an indication of what content items have been found.

In one embodiment the content navigation module may be further configured to be responsive to said cursor being at a display position of said one or adjacently displayed content item identifier in said first list to initiate generation of said second list. In this way, the second list is generated by a viewer indicating an interest in a content item on the first list and then related or associated content items being found and their identifiers being displayed in the second list.

Suitably, a viewer or user actuated control signal is generated to move said cursor to a display position of a content item identifier of said second list, said cursor movable in said second direction from a display position of said content item identifier of said second list to a display position of an adjacently displayed content item identifier of said second list responsive to user input. The cursor may be moved from adjacent identifier to adjacent identifier in a similar fashion to moving between display indicia on an EPG In an embodiment the content navigation module may be further configured to be responsive to a second user actuated control signal to move said cursor to a display position of a content item identifier of said first list. For example a special "fast" key may be assigned to move the cursor between lists. Optionally, the function of a key may be assigned depending on which list the cursor is on.

In a particular embodiment the content navigation module is further configured to display said cursor with a direction indicator for indicating a direction in which said cursor is movable, thereby providing an indication to a viewer of the direction in which a cursor may be moved.

In one embodiment the content navigation module may be configured to be operative in a first and second mode wherein in said first mode only content item identifiers identifying content items of said first content domain are displayed and in said second mode only content item identifiers identifying content items of said second content domain are displayed. The content navigation module may be further configured to be operative in a third mode wherein said third mode only content item identifiers identifying content items of said third content domain are displayed.

In an embodiment usable with a TV remote control or the like the content navigation module may be invokable responsive to a signal indicative of actuation of a one of an "UP" or "Down" key of a remote control device and be responsive to a signal indicative of actuation of a one of an "UP" or "DOWN" key of a remote control device to move said cursor in said first direction when said cursor is at a display position of a content identifier item of said first list.

In such an embodiment usable with a remote control the content navigation module may be further configured to be responsive to a signal indicative of actuation of a one of an "LEFT" or "RIGHT" key of a remote control device to move said cursor in said second direction when said cursor is at a display position of a content identifier item of said second list. Such an embodiment may be further configured to be responsive to a signal indicative of actuation of a one of an "UP" or "DOWN" key of a remote control device to move said cursor to a display position of a content identifier item of said first list when said cursor is at a display position of a content identifier item of said second list.

Viewed from a third aspect there is provided a system, comprising:
a content receiver switchable between at least a first receiver mode operative to receive a content item of said first content domain and a second receiver mode operative to receive a content item of said second content domain; and
a content navigation module described above responsive to user actuation of a content item identifier displayed on said display device to select a content item identifier and initiate in said receiver a receiver mode corresponding to the content domain of said selected content item identifier.

In one embodiment said content navigation module is responsive to said user actuation to initiate in said receiver access to a selected content item corresponding to said selected content item identifier and wherein said content receiver is configured to access said selected content item responsive to said initiation by said content navigation module.

Typically, an embodiment of the system further comprises a wide area broadband communications network providing said first content domain and a broadcast video network providing said second content domain. An embodiment may comprise a local area network providing said third content domain.

Viewed from a fourth aspect the present invention provides method of content navigation for selecting content from at least a first content domain and a second different content domain, comprising driving a display device to display one or more content item identifiers identifying content items of said first content domain and content item identifiers identifying one or more content items of said second content domain in a common display arrangement.

Viewed from a fifth aspect there is provided a computer program comprising computer program elements operative in a data processing apparatus to implement the content navigation module and/or the method as set out above.

Typically, there is provided a carrier medium carrying a computer program as set out above. The carrier medium may be any suitable medium, for example an electronic signal, an optical or rf carrier signal, magnetic media and digital versatile disk.

Viewed from a sixth aspect, there is provided a content navigation module operative to provide a user interface for selecting content from at least a first content domain and a second different content domain, configured to drive a display device to display one or more content item identifiers identifying content items of said first content domain and content item identifiers identifying one or more content items of said second content domain in a common display arrangement, the content navigation module being further operative to reduce a number of displayed one or more content item identifiers identifying content items of at least one of said first and second content domains dependent upon selection of at least one displayed filtering function by a user.

Viewed from a seventh aspect, there is provided a method of content navigation for selecting content from at least a first content domain and a second different content domain, comprising driving a display device to display one or more content item identifiers identifying content items of said first content domain and content item identifiers identifying one or more content items of said second content domain in a common display arrangement, the method further comprising reducing a number of displayed one or more content item identifiers identifying content items of at least one of said first and second content domains dependent upon selection of at least one displayed filtering function by a user.

One or more embodiments of the present invention are described further hereinafter, by way of example only, with reference to the accompanying drawings in which:

FIG. 1 schematically illustrates components and communication links of a system for providing access to content from a plurality of sources in accordance with an embodiment of the invention;

FIG. 2 schematically illustrates the system of FIG. 1 in more detail;

FIG. 3 schematically illustrates a media display management server and components thereof in accordance with an embodiment of the invention;

FIG. 4 schematically illustrates a content receiver and components thereof in accordance with an embodiment of the invention;

FIG. 9 shows a screenshot of a screen displayed by a TV guide module in accordance with an embodiment of the invention when invoked by a user.

A detailed description of one or more embodiments of the invention follows with reference to the figures provided.

Figure 1:
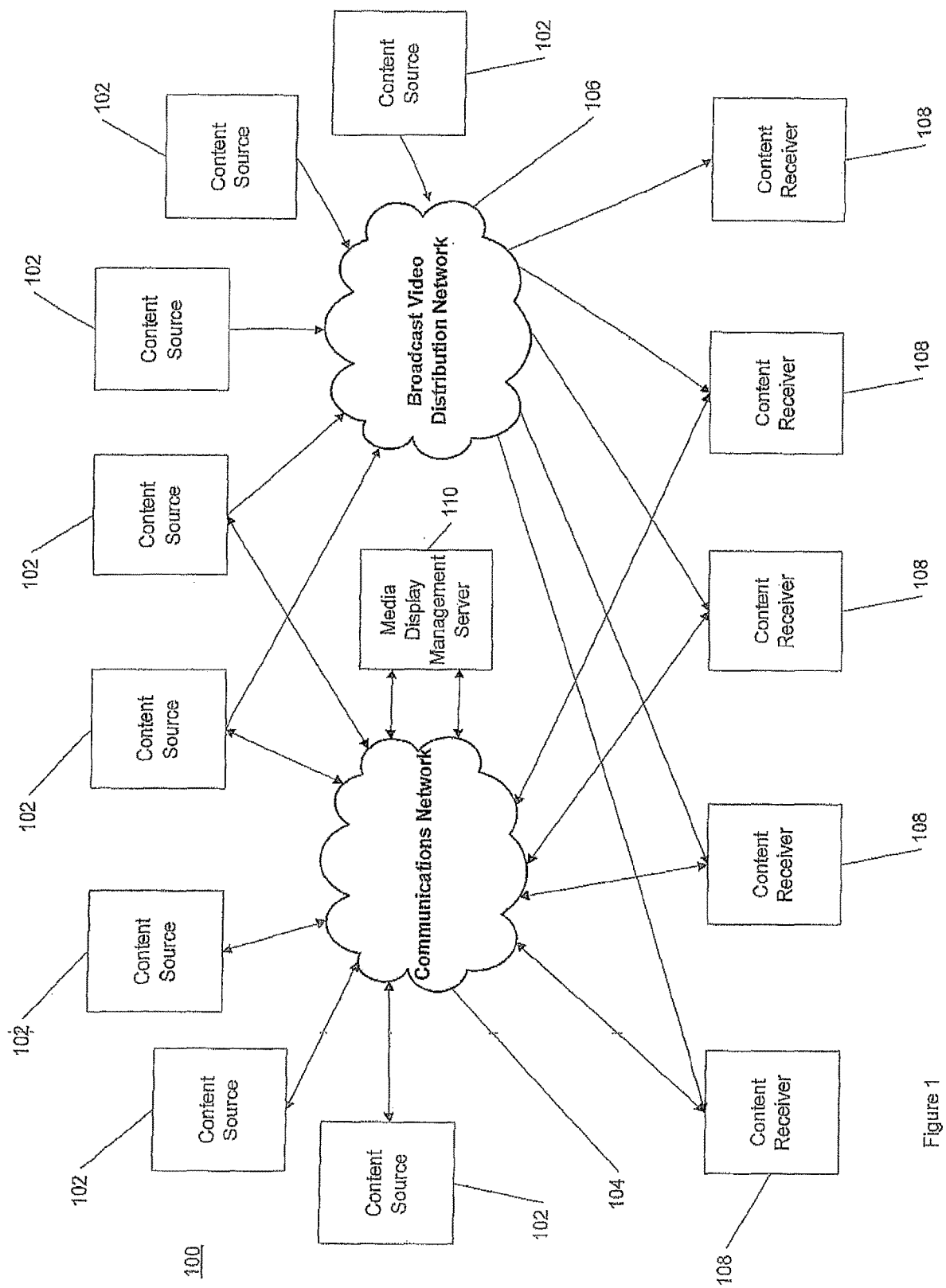

FIG. 1 schematically illustrates components and communication links of a system 100 for providing access from one or more content receivers to content from a plurality of sources. The system 100 comprises a plurality of content sources 102 arranged to distribute content for reception by a plurality of content receivers 108 (e.g. set-top boxes) and subsequent viewing of the content on a display associated with the respective receivers 108 over at least one of a communications network 104 (such as: a wide area network (WAN), e.g. the Internet; local area networks (LAN); or a combination of two or more such networks) and a broadcast video distribution network 106 (e.g. a terrestrial cable IPTV or satellite television broadcast system). The system 100 also comprises a media display management server (MDMS) 110 which controls content configuration and distribution of content to the content receivers 108 and provides a content search and/or discovery and/or navigation module and other services. The MDMS 110 provides a content management environment responsible for the presentation of the content accessed by content receivers 108 (or users thereof) registered with the MDMS 110, giving users a consistent, quality controlled, user interface experience across multiple content types such as broadcast TV, interactive content, and Internet video content.

A media display management module (not shown) is provided in the content receivers 108 for managing the content search, discovery, navigation and presentation on the content receivers 108. The media display management module is configured to communicate with the MDMS 110 over the communications network 104.

The MDMS 110 and the media display management module configure content for display based upon a set of parameters specified by one or more of: a content provider; a user of a content receiver 108; a content receiver 108 manufacturer; and a service provider. The parameters may be embedded as operating parameters of a content receiver 108.

Figure 2:
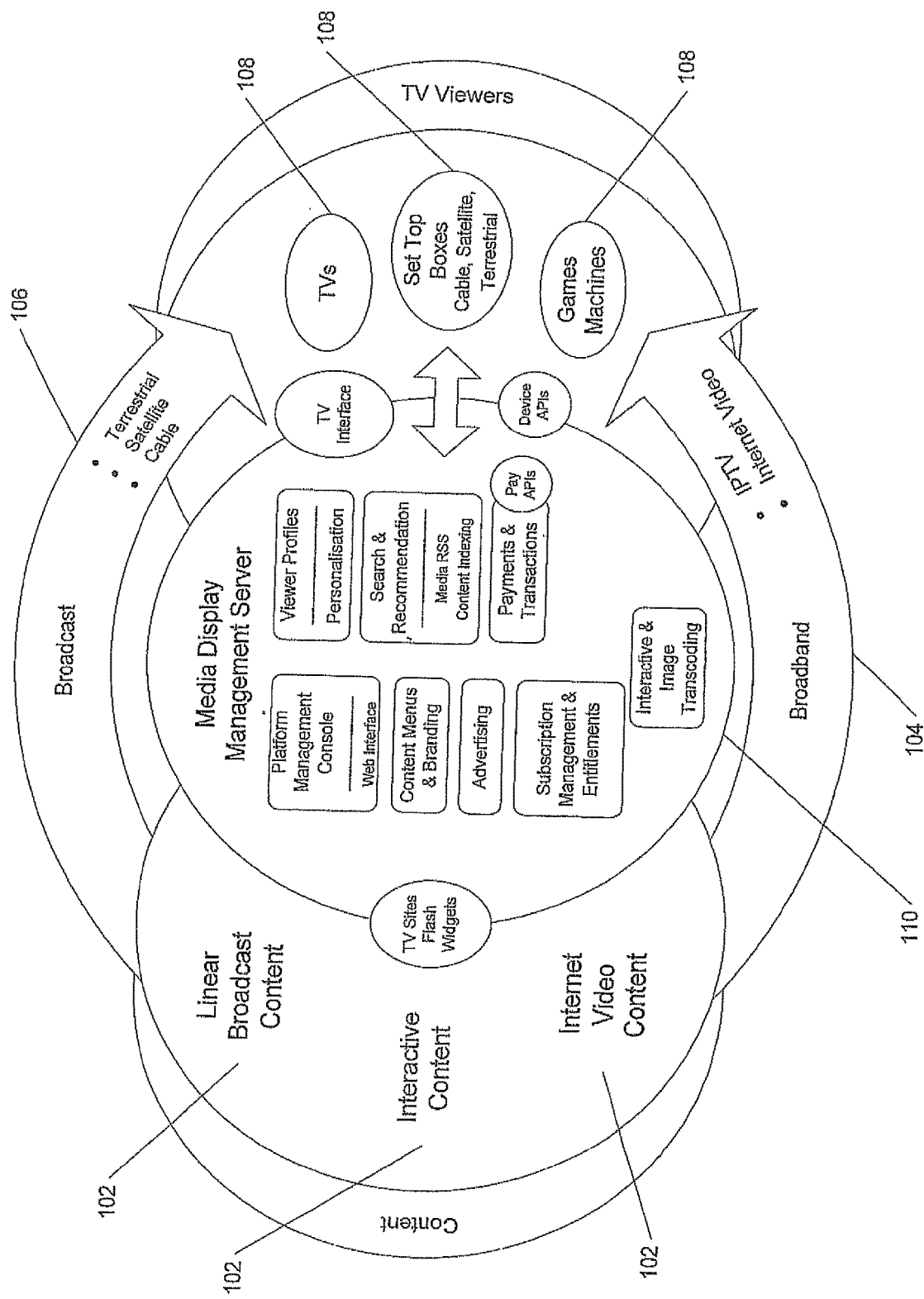

FIG. 2 schematically illustrates the features of FIG. 1 in more detail and provides an overview of the functional elements and modules of the MDMS 110. The features illustrated in FIG. 2 which correspond to features already described in relation to FIG. 1 are denoted by like reference numerals.

In the illustrated embodiment, the MDMS 110 offers a client-server relationship with content receivers 108 comprising TV devices (such as set-top boxes), or as a web service via device Application Programming Interfaces (APIs) to TV devices and other systems. Content receivers 108 comprising TV devices that connect to the MDMS 110 may have embedded in them a content receiver specific client (e.g. media display management module) that enables at least a portion of platform services of the MDMS 110 and content owner and original equipment manufacturer (OEM) branding, i.e. branding for the content receiver, manufacturer or supplier, to be maintained uniformly across device types. Once ported, code changes may not need to be made to the device software to add additional content, features and branding.

For content receivers 108 that connect to the MDMS 110 and which do not have embedded client software, the platform services and content can be enabled via direct services application program interfaces and a TV device user interface. In these instances, a sub-set of the full platform functionality may be used, and content owner and OEM configured branding and services may not be fully-reflected in the interface displayed to the user because of the limitations thereof. However, certain minimal elements may be required to be supported as a condition of utilising the APIs.

Internet video traffic delivered to TV devices does not pass through the MDMS 110, but utilises the direct streaming services, protocols, codecs and networking paths from the content owners to the TV devices. While these services, protocols, codecs and the networks utilised are common to Internet video streaming to PCs, TV receivers may only be capable of processing a subset of these protocols and codecs.

Likewise, broadcast content delivered to TV devices does not pass through the MDMS 110 either, but is subject to broadcasting protocols and transmission paths common to broadcast of TV signals to TV devices over suitable media (e.g. Satellite, Antenna, and Cable).

Using the MDMS 110, content owners and media aggregators (i.e. parties who aggregate syndicated web content such as news headlines, weblogs (blogs), podcasts, vlogs (video blogs) in a single proposition) can register and manage their services and content for discovery and use by content receivers 108 configured to receive content made available through the MDMS 110. Content owners can also configure additional products and services via the MDMS 110 such as content subscriptions and promotions and their content owner branding and interactive options are preserved across all devices wherever their content is displayed.

A content receiver user having content stored on their own local content domain may also be able to register and manage content stored on that local content domain using the MDMS 110, and for discovery and use using their content receiver. In this case, the content receiver user is effectively another content owner.

The MDMS 110 implements a range of functions, namely:
 a. The registration of Internet video sources and libraries to enable the search, discovery, navigation and playing of content on multiple TV device types;
 b. The registration of interactive destinations and TV applications to enable their search, discovery, navigation and access on multiple types of TV device;
 c. The management of content branding, media searches, recommendations, interactive links and promotions for content owners (including advertising and sponsorships) such that the correct branding and facilities are displayed to the viewer whenever their content is being accessed, across multiple types of TV device—this capability is common to TV broadcasters, Internet video aggregators, and interactive application owners;
 d. The registration of "users"—such as TV viewers, and the management of their personalisation information, such that a viewer's identity and personalisation information is available across multiple types of TV device;
 e. The provision of a range of content discovery services, such as:
  i) Centralised search across all content;
  ii) Content recommendations;
  iii) Content sharing between community members;
  iv) Content promotion for content owners;
  v) Resolution of TV Keys™
 f. The implementation of distribution arrangements and rights restrictions for content owners, particularly the enforcement of territory rights restrictions.
 g. Centralised subscription payments services and micro billing (billing for individual content items) for all content owners;
 h. Advertising services which may comprise a range of products, for example:
  i) "click through" advertising links to video or interactive destinations;
  ii) Insertion of video advertising in playlists and video content consumption;
  iii) Interfacing to standard $3^{rd}$ party Internet ad serving infrastructures and campaign management and sales facilities; and
  iv) The provision of viewer targeting data to $3^{rd}$ party ad serving engines.

Figure 3:
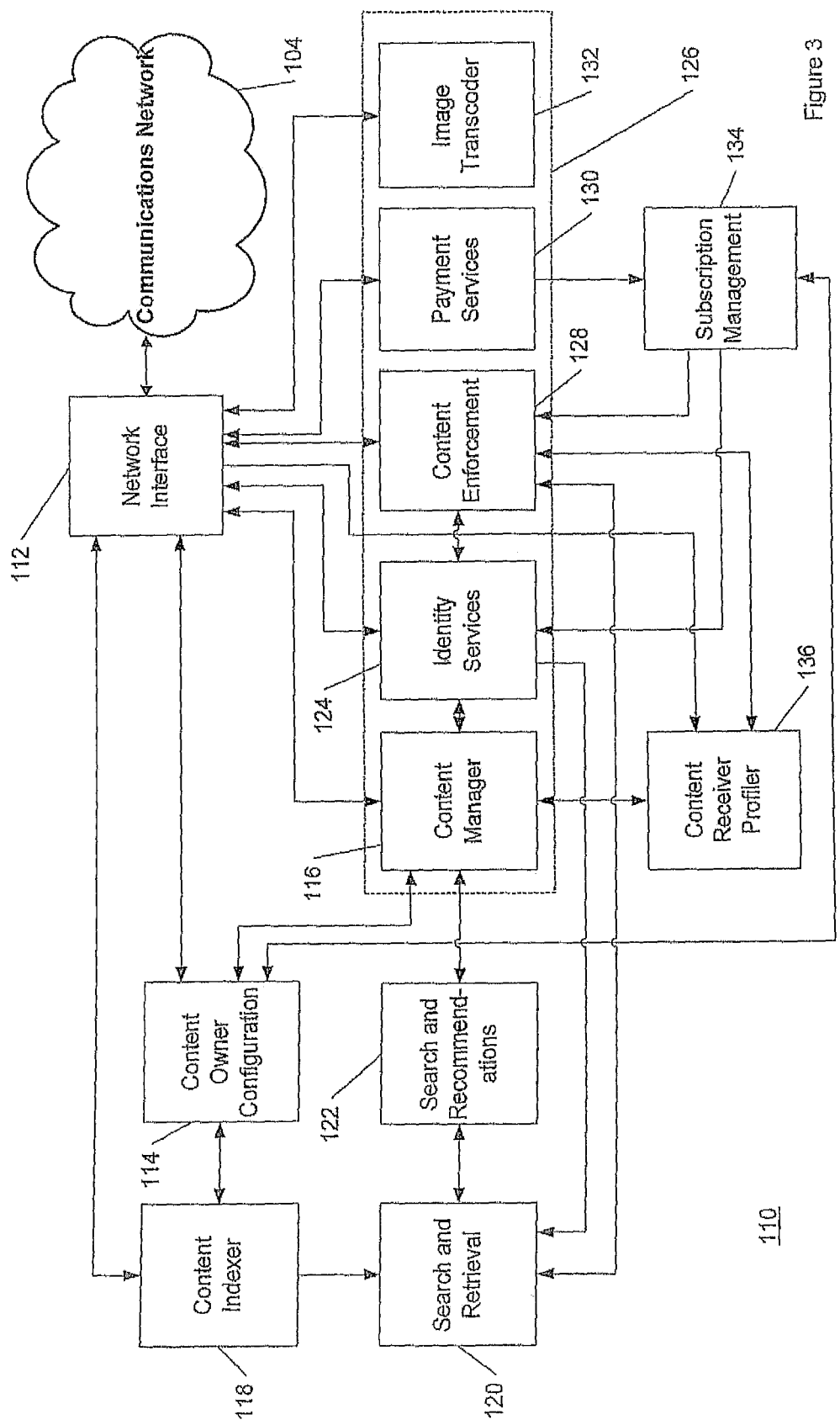

FIG. 3 schematically illustrates the MDMS 110 and components thereof according to one or more embodiments of the present invention.

The MDMS 110 includes a network interface 112 providing a route through which the MDMS 110 is coupled to the communications network 104. The MDMS 110 communicates with the content sources and content receivers over the communications network 104 via the network interface. Content received at the MDMS 110 from the content sources may include, for example, content metadata to feed a search and retrieval module (e.g. Web feeds such as RSS XML feeds), content owner branding data for application to content to be displayed, other content owner rules relating to display and consumption of their content.

A content owner configuration module 114 of the MDMS 110 is configured to provide a mechanism for content owners to register and manage their content. The content owner configuration module 114 comprises a processor and a data storage module.

When initially registering their content with the MDMS 110 to make such content available to viewers having content receivers configured to receive such content via the MDMS 110, content owners conduct a set-up process using the content owner configuration module 114. This set-up process may be conducted by the content owner, perhaps at a remote location, by way of a content owner terminal, for example, a PC, arranged to communicate with the content owner configuration module 114 via the communications network 104 and network interface 112.

In an example, the content owner could use the PC to navigate to a specific web-page to initiate the set-up process. The content owner configuration module 114, upon receiving a request for the web-page data from the PC, transmits the relevant web-page data to the PC of the content owner to allow the content owner to conduct the set-up process. The content owner is presented with a content owner interface which displays a number of functions relating to how it wishes to configure its content. In this regard, the content owner can define:
 Its MediaRSS feeds and associated parameters that will be retrived by the content indexer 118. This is so that the content owners content items can be presented to a user in search results and recommendations when they are relevant to the search or recommendation being performed by the MDMS 110.
 Content item presentation information such as their branding
 The categories of content they support e.g. general video, news etc.
 Content subscription packages and pricing and the rules used to identify the content items that belong to each subscription package.
 Distribution arrangements such as the OEMs or service providers (collectively termed operators) on whose content receivers their content is to be made available and/or in which territories their content can be made available.

The content owner may also wish to configure a content menu application to be made available to the viewer when the viewer is consuming content from that content owner. Again, this content menu registration option may be specified during the initial set-up process or at a later time. The content menu registration option also provides the content owner with the ability to configure specific menu items which access services of the MDMS such as: a search application which allows a viewer to search only within content of that content owner; a content recommendations application which provides a viewer with recommendations from the content of that content owner; quasi-channel applications in which themed content from that content owner is arranged into such quasi-channels either statically or dynamically using pre-defined searches and recommendations which can then be performed without data input from the end viewer; and an advertising application whereby space on the content menu of that content owner can be sold for advertising or can be used to promote specific content from that content owner with the ability to click through the advertising to a piece of content or an interactive destination.

The content owner indicates that the content is configured as they require it to be using the content owner interface of the web-page displayed at their terminal and, upon such indication; the terminal transmits this configuration parameters data via the communications network 104 and network interface 112 to the content owner configuration module 114. Upon receipt of the data, the content owner configuration module 114 sends a confirmation to the content owner terminal that the configuration parameters data has been received and stores the configuration parameters data within its data storage module.

Although described from the viewpoint of a content owner specifying their requirements, a service provider and/or an OEM and/or an end user (e.g. a viewer) could specify their own branding and presentation requirements and menus using the same interface, though the options available for configuration may be different for these different roles.

The data storage module of the content owner configuration module 114 is configured to maintain a database of the content configuration parameters data for retrieval by a content manager 116 which can subsequently apply the content configuration parameters data to content to be transmitted to content receivers.

The MDMS 110 is arranged to retrieve the content metadata configured by the content owners to enable the provision of content search and recommendations to content receivers. The content metadata is retrieved over the communications network by the content indexer 118, optionally as a media RSS XML feed. The content indexer 118 retrieves the content owner feed configurations from the content owner configuration 114, retrieving and processing the content owner feeds as specified. The content indexer 118 augments the metadata retrieved from the content owner with derived data using MDMS rules (such as the appropriate MDMS quality classification and the protocols and codecs implied by the one or more content references) and data derived using the relevant content owner configuration retrieved from the content owner configuration 114 (such as the presentation information, distribution networks and territories and the subscription packages that each content item is associated). The XML metadata for each content item is then passed to a search and retrieval module 120 which indexes and stores the content metadata data in its associated storage.

The received content metadata includes data (e.g. a URL) identifying a location at the content source of the actual content instances to which it relates (with each content instance being associated with a different protocol/codec/bandwidth combination) and thus the search and retrieval module 120 maintains a list of content references for each content item registered by content owners.

A search and recommendations module 122 is arranged as an access layer to the search and retrieval module 120. This exposes a straightforward XML based services API to the content manager 116 for each of the service requests the content manager 116 requires and implements each of these requests utilising one or more of the proprietary APIs and services provided by the search and retrieval module 120.

The MDMS 110 further comprises an identity services module 124 comprising a processor and a user identity storage module. The user identity storage module of the identity services module 124 is configured to store data relating to identities corresponding to different users of a content receiver, e.g. an identity for each individual member of a household. This module provides a user profile data model to be associated with the identities which may comprise:

nickname
personal details including a unique mobile number and/or email address
viewing and content preferences including PIN protection settings
content receivers that this profile is associated with
purchased subscriptions and content items
content item history
content item ratings
content item bookmarks and playlist tags Various user actions on the content receiver initiate communication with the identity service module 124 some of which result in the current users profile being updated by the identity services module 124. Examples of these communications include: editing and saving user details and preferences, viewing bookmarks, bookmarking a content item, rating a content item, viewing a content item etc. A default identity of a content receiver may be tied to a unique identifier of the content receiver itself which is used when no individual identity has been identified. This default identity may be associated with the subscriber details where the content receiver has been provisioned by a service provider.

With this arrangement, profile information of users (including, for example, feedback from their consumption of content) can be used to improve targeting and particularly recommendations of content to specific users. This is achieved by the identity services module 124 creating user profiles in the search and retrieval module 120 and populating these with the content items consumed by each user profile. The search and retrieval module can then make consumption informed user recommendations when requested by the search and recommendations module 122.

In response to reception at the MDMS 110 of an instruction from a content receiver to switch user (such instruction invoked by a user action in relation to the content receiver, i.e. selection of a user associated with the content receiver and optionally the entering of a personal identification number (PIN) code, e.g. via a remote control), the instruction, user identifier, receiver identifier and optional PIN are delivered to the identity services module 124 via network interface 112. The identity services module 124 retrieves the relevant users profile data from its storage module, checks the PIN if required and, if successful, records the new user as the current user for this content receiver in its storage module and generates and returns to the content receiver the user menu appropriate for this user on this content receiver. This new user menu may result in additional requests from the content receiver to the content manager 116 to populate content items (such as the user content recommendations).

When a user of a content receiver wishes to search for specific content and initiates a search via their content receiver to search for such specific content (described later), a search request is received by the network interface 112 via the communications network 104 for the content receiver and delivered to the content manager 116. The content manager 116 then constructs the search query adding a number of additional constraints to the search that are derived from the capabilities and attributes of the content receiver. In particular the content receiver may provide the content receiver identifier, type and operator as part of the search request and the source IP address can be determined from the TCP/IP networking protocols. These are passed to the content receiver profiler 136 which determines and returns:

- The protocols and codecs supported by this type of content receiver. This data is configured and stored for each type of content receiver in the content receiver profiler 136. The dataset for this type of content receiver is retrieved from this store.
- The operator associated with this content receiver.
- The bandwidth capability of this content receiver's network. This bandwidth would have been submitted to the content receiver profiler 136 by the content receiver during an earlier bandwidth test, typically performed on booting the content receiver and stored by the content receiver profiler against the content receiver identifier.
- The determined territory of the content receiver. This is derived from the source IP of the content receiver using an IP to geographical location (in this instance, territory) mapping table.

The content manager 116 then instructs the search and recommendations module 122 to execute the constructed search query. The search and recommendations module 122 extracts the search parameter data from the request in order to address the specific interface of the search and retrieval module 120. The search is then performed by the search and retrieval module 120 as instructed by the search and recommendations module 122 and the metadata of the relevant content items is retrieved and returned to the content manager 116. These search results are then transmitted to the content receiver from which the search request was received. Further details relating to the processing of data for this outgoing transmission will be discussed later.

The effect of the combination of this constrained search query implemented by the content manager 116 against the content metadata augmented by the content indexer 118 is to ensure that only content appropriate for and functional on the content receiver is presented to the user. This process applies to recommendations and other content requests.

When a user of a content receiver instigates a search, any content results returned to the user may optionally be tailored for that user based upon the user's profile. Thus, in this case, the content manager 116, upon receipt of a content request via the network interface 112 adds further constraints to the search query. First it requests the user profile data related to the current user who requested the search to the identity services module 124. The identity services module 124 retrieves the user profile data and returns this to the content manager 116. The content manager 116 amends the search request data to include any relevant profile settings (such as safe search i.e. no adult content) as additional terms in the search query prior to submitting the query to the search and recommendations module 122. Upon reception of such amended search request data, the search and recommendations module 122 proceeds in the manner described above to retrieve the metadata of content items relevant to the search request and these search results are returned to the content manager 116. In addition the content manager 116 may augment the content item metadata returned with relevant user specific metadata such as the user's rating, any user tags, whether or not the user is already entitled to view the content as part of one of their active subscription packages etc. before transmitting the content metadata to the user's content receiver. Thus a personalised form of content presentation can be delivered to the user while still maintaining the requirements and constraints of other parties (i.e. content owner, etc.).

In some instances a further variation of the above scheme may be utilised, particularly when a user has knowledge of the content items being displayed (such as their bookmarked content items), where content items that are not functional on the device are still returned in the results but have their content item metadata further augmented to indicate that they are non-functional content items. This avoids the user thinking that the system has lost content items that they are aware of if they move between content receivers with different capabilities.

The MDMS 110 offers a range of functions to a user of a content receiver which might include, for example: video search and recommendations; interacting with content provider menus; registering new profiles (individual identities); administering payment instruments and billing, transactions and payments authorisation; managing favourites, playlists and history; interacting with messages and other users; and setting up user preferences and options.

A display format for display of the content owner specified and/or personalised form of content on a display screen is delivered to a content receiver from the content manager 116 via network interface 112 and communications network 104. This display format is controlled by the content manager 116 based upon the content configuration parameters data stored in the data storage module of the content owner configuration module 114 and/or the user profile data stored for the current user in the storage module of the identity services 124

The display format is delivered in markup which describes how to display the required functionality of the user interface either via a graphical menu on the TV screen or via a browser application on the content receiver or a third party interactive TV engine.

Communication between the content receiver 108 and MDMS 110 takes place via the content receiver services module 126 which is arranged to service requests from the content receiver 108, enforce security and access controls for protected premium content and may compile XML content responses into a binary representation of XML for efficient communications and processing on the content receiver.

The content receiver services module 126 comprises the following modules: content manager 116 (as hereinbefore described); identity services module 124 (also hereinbefore described); content enforcement module 128; payment services module 130; and image transcoder 132.

The content enforcement module 128 is the element of the content receiver services module 126 configured to gate and authorise the playing of protected (e.g. premium or restricted) content. The content enforcement module 128 operates in conjunction with a payment services module 130, subscription management module 134, the identiy services 124 and the content receiver profiler. Such enforcement is implemented by checking territory restrictions, subscription entitlements, informing the user of any gating actions required (e.g. PIN entry required, purchase required, etc.) and requesting authorised content URLs from content owners to provide a content receiver access to a content item. In this regard, a request for a content URL is sent from the content receiver and received at the MDMS 110 via the network interface and forwarded to the content enforcement module 128. The content enforcement module 128 first makes a request to the search and retrieval module 120 for content metadata relating to the content item which the user has requested. The processor of the search and retrieval module 120 retrieves the content metadata from the data storage module of the search and retrieval module 120 and returns the retrieved content metadata to the content enforcement module 128. If the content item is identified as a premium content item the content enforcement module 128 requests the current users subscription entitlements from the subscription management module 134. The subscription management module 134 retrieves and returns the users active subscription entitlements to the content enforcement module 128 and the content enforcement module 128 checks these against the content item subscription packages to determine if the user is entitled to view the content item. If the content item is identified as being restricted by territory the content enforcement module 128 requests the content receiver's territory from the content receiver profiler 136 and checks if the content receiver is entitled to access the content item. Finally the content item is checked to see if it is marked as restricted.

If all conditions are met and the user is eligible to view the content the URL of the content item is transmitted by the content enforcement module 128, via the network interface 112, to the content receiver. Upon reception of the content URL the content receiver can then retrieve and play the requested content item from the content owner's content source. Optionally the content enforcement module 128 may request a content access authorisation token from the content owner which is transmitted to the content receiver and used by the content receiver when retrieving the content item. This enables the content owner to restrict access to their content to trusted MDMS content receivers.

If, as a result of a determination by the content enforcement module 128 the content requested by a user cannot be viewed by that user then the content enforcement module 128 transmits, via the network interface 112, to the content receiver one of a number of response conditions:

Subscription required with the subscription offers. The offers are presented and if one selected a payment process is initiated by the content receiver against the payment services module 130. On completion of this process the content URL is re-requested from the content enforcement module 128.

PIN required. The PIN is then submitted with a re-request for the content URL which is checked by the identity services module 124 before the content URL is returned.

Unauthorised content. Access to the content is denied.

When a payment process is initiated against the payment services module 130 the content receiver issues a request to the payment services module 130 which returns for payment details to the content receiver. This causes the content receiver to effect display of a payment details request message on an associated display device. In response to the message a user may have the options of rejecting the request for payment details or accepting the request. If the request is accepted, the user is prompted to enter appropriate payment details which are returned to the payment services module 130 via the communications network 104 and network interface 112. As will be appreciated, the user commands in response to the payment details request may be entered via a user interface device, such as a remote control, of the content receiver.

When payment details data is received, confirmed and successfully processed by the payment services module 130, it transfers the subscription purchased to the subscription management module 134 where it is stored against the current user in the associated subscription storage module.

The subscription management 134 also forwards this information to the identity services module 124 to update the user profile data relating to that user to include the subscription package upgrade.

Image transcoder 132 is configured to re-encode images stored in standard web formats (e.g. portable network graphics (PNG), JPEG) to a format supported by any given content receiver. Thus, when image data is transmitted to a content receiver, the image transcoder 132 ensures that such images are supported for display by that content receiver. The content receiver informs the image transcoder the source image URL and what image format it requires. The image transcoder 132 retrieves the source image URL over the network interface 112 and then transcodes the image into one of the required formats before transmitting the transcoded image to the content receiver.

Figure 4:
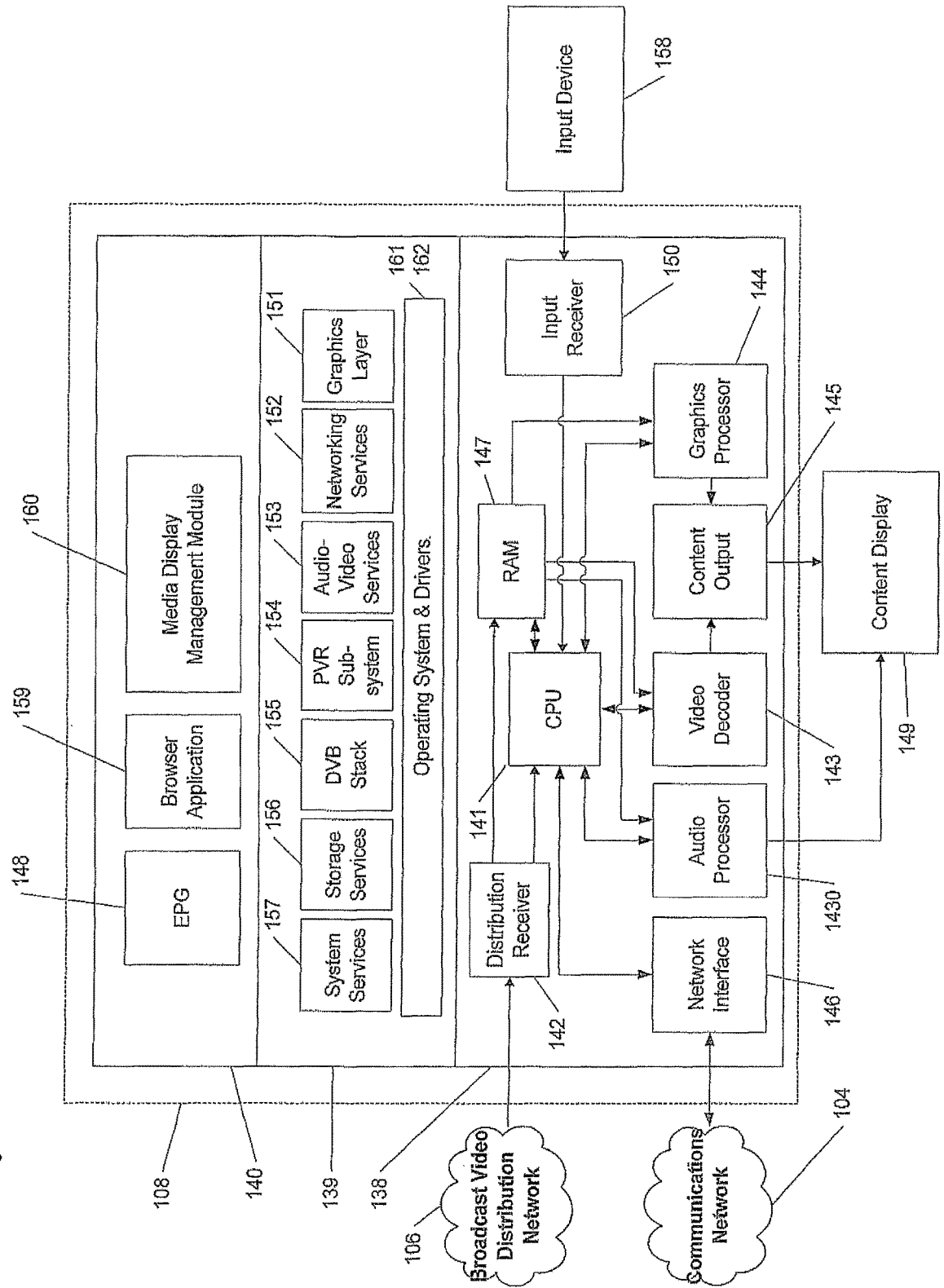

FIG. 4 schematically illustrates a content receiver 108, components thereof and components related thereto. The content receiver 108 receives content via the communications network 104 and broadcast video distribution network 106 and can transmit data to the MDMS 110 via communications network 104. Whilst data paths are illustrated between some elements of the content receiver 108, not all data paths are illustrated for the purposes of clarity.

The content receiver 108 comprises a hardware components layer 138, a OS, drivers and middleware layer 139 and a software applications layer 140. Applications in the OS, drivers and middleware layer 139 and software applications layer 140 are arranged to run on a processor (CPU) 141 of the content receiver 108.

Along with CPU 141, the hardware layer 138 comprises a distribution receiver 142, a network interface 146, a video decoder 143, an audio processor 1430, a graphics processor 144, a content output module 145, a memory component (RAM) 147 and an Input receiver 150.

The distribution receiver 142 (such as a tuner for receiving a terrestrial digital television broadcast) receives content at the content receiver 108 from the broadcast video distribution network 106. The data portion of such received content is communicated to the CPU 141 which, in conjunction with an electronic programme guide application (ERG) 148 running thereon, processes EPG data for use by the EPG application A video portion of the received content from the broadcast video distribution network 106 is decoded using the video decoder 143 which is instructed by the CPU 141 to retrieve video content from the distribution receiver 142 (typically using direct memory access to the RAM 147). The video content is prepared for output on the content display 140 by the content output module 145. The content output module 145 overlays any graphic output required by any of the software applications identified in the software applications layer 140 as output by the graphics processor 144 under instruction from the CPU 141 over the video content and outputs the combined output to the content display.

An audio portion of the received content from the broadcast video distribution network 106 is processed by the audio processor 1430 and output to the content display 149.

Output protocols supported by the hardware of the content receiver 108 may comprise one or more of: High Definition Multimedia Interface (HDMI); Component Video; SCART; Composite Video and audio outputs such as Dolby Digital and stereo analogue, The OS, drivers and middleware layer 139 comprises a graphics layer module 151, a networking services module 152, an audio services module 153, a personal video recorder (PVR) sub-system module 154, a digital video broadcasting (DVB) stack module (156), a storage services module 156, a system services module 157, and an operating system application 161 and drivers 162. These modules are conventional features on many content receivers (such as set-top boxes). Further description of these modules will therefore only be provided where necessary in relation to the functioning of one or more embodiments of the present invention.

Input receiver 150 is arranged to receive commands for controlling the content receiver 108, such commands being input by a user by way of an input device 158. The commands may be entered using, for example, a set-top box remote control device through which commands are entered by the user by pressing specific keys of the remote control device. A control signal from the remote control is transmitted to the content receiver 108 by any suitable means, e.g. infra-red transmission.

The software applications layer 140 of the content receiver 108 comprises: an EPG module 148 (referred to above); a browser application 159; and a media display management module application (MDMM) 160.

Although a browser application is shown in the illustrated embodiment, other suitable interactive display engines may be used, e.g. a flash engine or SVG engine.

The MDMM 160 runs on the CPU 141 and configures the CPU 141 for communication (via network interface 146) with the MDMS 110 in order to manage content received at the content receiver 108 over the communications network 104. Commands input by a user requesting delivery of a content item to the content receiver 108 are received at the input receiver 150 and communicated to CPU 141 which implements the MDMM 160 to request content data appropriate to the command from the MDMS 110.

Where the CPU 141 instructs the video decoder 143 and audio processor 1430 to process video received over the communications network 104 via the network interface 146 this will be marshalled by the CPU 141 in RAM 147 and then the video and audio portions will be retrieved by the video decoder 143 and audio processor 1430 using DMA in the same manner as when the video was received over the broadcast video distribution network 106 via the distribution receiver 142.

CPU 141 also implements MDMM 160 to manage and control content received at the content receiver 108 over the broadcast video distribution network 106.

Figure 5:
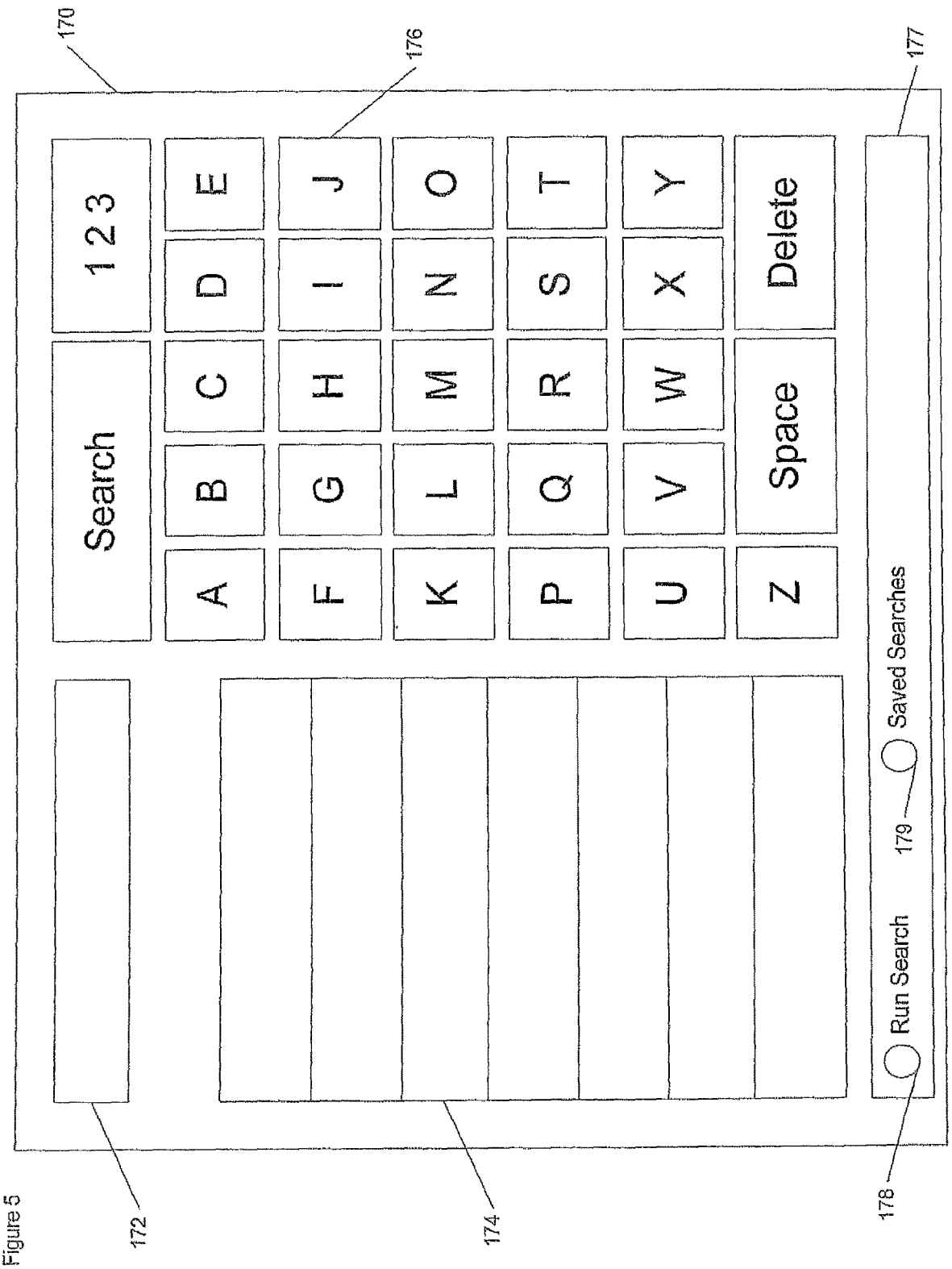
FIG. 5 shows a screenshot of a screen displayed by a content navigation module in accordance with an embodiment of the invention when invoked by a user.

FIG. 5 shows a screenshot 170 of a screen displayed by a content navigation module when invoked by a user. In a particular example, the user may enter commands to initiate navigation to such a module. For instance, a viewer menu module may be invoked, for example, by a user pressing a "Left" button on a remote control when viewing broadcast TV content, and a viewer content navigation module is then reached by way of a further keypress (e.g. selecting an item in the menu). A branded content owner menu may be invoked, for example, by a user pressing a "Right" button on a remote control when viewing broadcast TV content. A branded content owner content navigation module is then reached by way of a further keypress (e.g. selecting an item in the menu). Alternatively, the content navigation module could be invoked directly e.g. pressing a "Red" button on a remote control.

Although this example relates to a content navigation module, other modules or menus (e.g. content owner, content receiver, and viewer menus, mini content guide (related to content currently being viewed) and expanded content guide (again related to content currently being viewed)) are envisaged and these may be navigated to using similar user input commands on a remote control. How these different capabilities are designed and invoked and when they are made available to the user forms a key part of the orchestration of competing parties aspirations in the user interface. For example a content owner menu may be available by pressing the "Right" button on the remote control when watching a content item. The particular content menu displayed is determined by the rules of the MDMM 160 to be the content menu for the currently active content item.

Template data for the content navigation module screen illustrated in FIG. 5 is stored in the data storage module of content owner configuration module 114 of the MDMS 110. The template data is populated by the configuration parameters data (described above) stored in the data storage module and so the format of the content navigation module screen will vary for different Operators, content providers and OEM contexts because these will all have specified different configuration parameters data. The template data, however represents a the configuration options available and when combined with particular configuration parameters data specifies a particular instance of the content navigation module as specified by a particular party.

A content navigation module initiation command input by a user is received by the CPU 141 which implements the MDMM 160 to request template data for the content navigation module screen from the MDMS 110. This template data is retrieved from the data storage module of content owner configuration module 114 of the MDMS 110 and sent to the communications network via the network interface 112. The content receiver 108 receives the template data via network interface 146. The CPU 141 instructs the graphics processor 144 to retrieve and render overlay graphics from the RAM 147 and these overlay graphics are combined with template data in the content output 145 for processing for display of the content navigation module on the content display 149.

The content navigation module may be embedded as sub-content (i.e. a sub-image) in content received at the content receiver and which content navigation module can be invoked whilst viewing the content by entering an appropriate command via a user input device 158. The content navigation module may also be treated as standalone content which need not be invoked whilst viewing content, but which can be invoked whilst performing any operation on the content receiver.

The screen of the content navigation module contains a search term entry field 172, a list of popular search terms 174, a virtual keyboard 176 and an instructions field 177.

A user may populate the search term entry field 172 using commands input via a user input device (such as a TV or set-top box remote control). By performing presses or multiple presses of numeric keys on the remote control (in a manner similar to character entry when creating text of an SMS) a user can enter alphanumeric characters in the search term entry field 172. A delete function may be assigned to a specific key (e.g. a left arrow key) to allow a user to delete characters if errors are made.

The virtual keyboard 176 can also be used to select alphanumeric characters in order to populate the search term entry field 172. A cursor comprising a movable indication or pointer feature can be used to denote which of the search term entry field 172, list of popular search terms 174, or virtual keyboard is currently, or is to be in use. In order to switch between the search term entry field 172 and the virtual keyboard 176, the user may invoke such a switch by pressing an appropriate key on the remote control having a switch function assigned thereto (e.g. a right arrow key) to move the cursor from the search term entry field to the virtual keyboard 176. A particular alphanumeric character (e.g. the letter "A") of the virtual keyboard 176 may be the default character indicated by the cursor when the virtual keyboard 176 is invoked. Navigation of the cursor around the keyboard is achieved by way of remote control keys having appropriate movement functions assigned thereto (e.g. Up, Down, Left, Right arrow keys). A conventional TV or set-top box remote control may be suitable. When a desired character has been reached, it is added to the search term entry field 172 by pressing a remote control key having an appropriate select function assigned thereto (e.g. Select key).

During the population process, the user commands are received by CPU 141 of the content receiver. The CPU 141 instructs the graphics processor 144 to retrieve overlay graphics data from the RAM 147 and these are passed to the content output 145 for updating the display.

In the illustrated embodiment, letter characters are the only type of alphanumeric characters shown on the virtual keyboard 176. However, the virtual keyboard may have a "123" icon which can be selected to transform the alphabetical keyboard to a numeric keyboard. When in the numeric keyboard state, the "123" icon will be replaced by an "ABC" icon to allow return to the alphabetic keyboard. In the same manner, different language (e.g. character sets such as Arabic or Hebrew) virtual keyboards can be supported as required by the operator, user, OEM or content owner configurations.

Aside from alphabetic and numeric characters and icons for switching between virtual keyboards appropriate to each, there are also displayed "Space", "Delete" and "Search" icons, with selection of the "Space" function implementing corresponding insertion of a space between characters in the search term entry field 172, and selection of the "Delete" function implementing deletion of a character in the search term entry field 172. Selection of the "Search" function executes a search for content based upon a search term entered in the search term entry field 172. The CPU 141, configured by the MDMM 160, sends a search request to the network interface 146 for transmission via the communications network 104 to the MDMS 110. The search request is received at the network interface 112 of the MDMS 110 and transferred to the content manager 116. Content manager 116 requests data from the search and recommendations module 122 based upon the data in the search request indicating the input search terms. The search and recommendations module 122 addresses search and retrieval module 120 to locate appropriate content data identifier items. If relevant content data identifier items are located by the search and recommendations module 122, these are transmitted to the content manager 116. The content manager 116 requests configuration parameters data for the content data identifier items from the data storage module of content owner configuration module 114. These are located and returned to the content manager 116 which forwards both the content data identifier items found as a result of the search and the configuration parameters data to the network interface 112 for transmission to the content receiver 108. The content data identifier items found as a result of the search and the configuration parameters data are received at the content receiver by the network interface 146 and transferred to the CPU 141 which instructs the graphics processor 144 to retrieve overlay graphics data from the RAM 141. The retrieved overlay graphics data is then passed to the content output 145 which processes the content data identifier items and updates the display screen data. Such display screen data, updated with the search results (i.e. the content data identifier items) is passed to the content display 149 to display the content navigation module populated with the search results.

The list of popular search terms 174 comprises a list of a plurality (e.g. twenty) of the most popular search terms, where the list is determined by characters entered in the search term entry field 172. As characters are populated in the search term entry field 172, the list of popular search terms 174 is updated. For example, if a user populates "A" in the search term entry field 172 then the list will contain a plurality of the most popular search terms beginning with the letter A. Such population proceeds via the same process as described above in relation to the display of search results.

The user can navigate the list using remote control keys having appropriate movement functions assigned thereto (e.g. Down and Up arrow keys) and can select a search term from the list to populate the search term entry field 172 by using, for example, a Select key of the remote control.

The list of popular search terms 174 may be arranged with most popular terms at the top thereof and with lower terms being of decreasing popularity.

Where no search term is populated in the search term entry field 172, then as a default, the list of popular search terms 174 may comprise, for example, the twenty "Most Popular" search terms. These may be relevant to the user's profile, for example, based on age, language, or location.

The instructions field 179 includes instructions to a user for implementing functions of the content navigation module. In the illustrated example screenshot 170 it is indicated 178, 179 that a particular key of the remote control having an appropriate function assigned thereto (e.g. Red key) can initiate the search, and a different key of key of the remote control having an appropriate function assigned thereto (e.g. Green key) should be pressed to allow the user to access their saved searches.

Figure 6A:
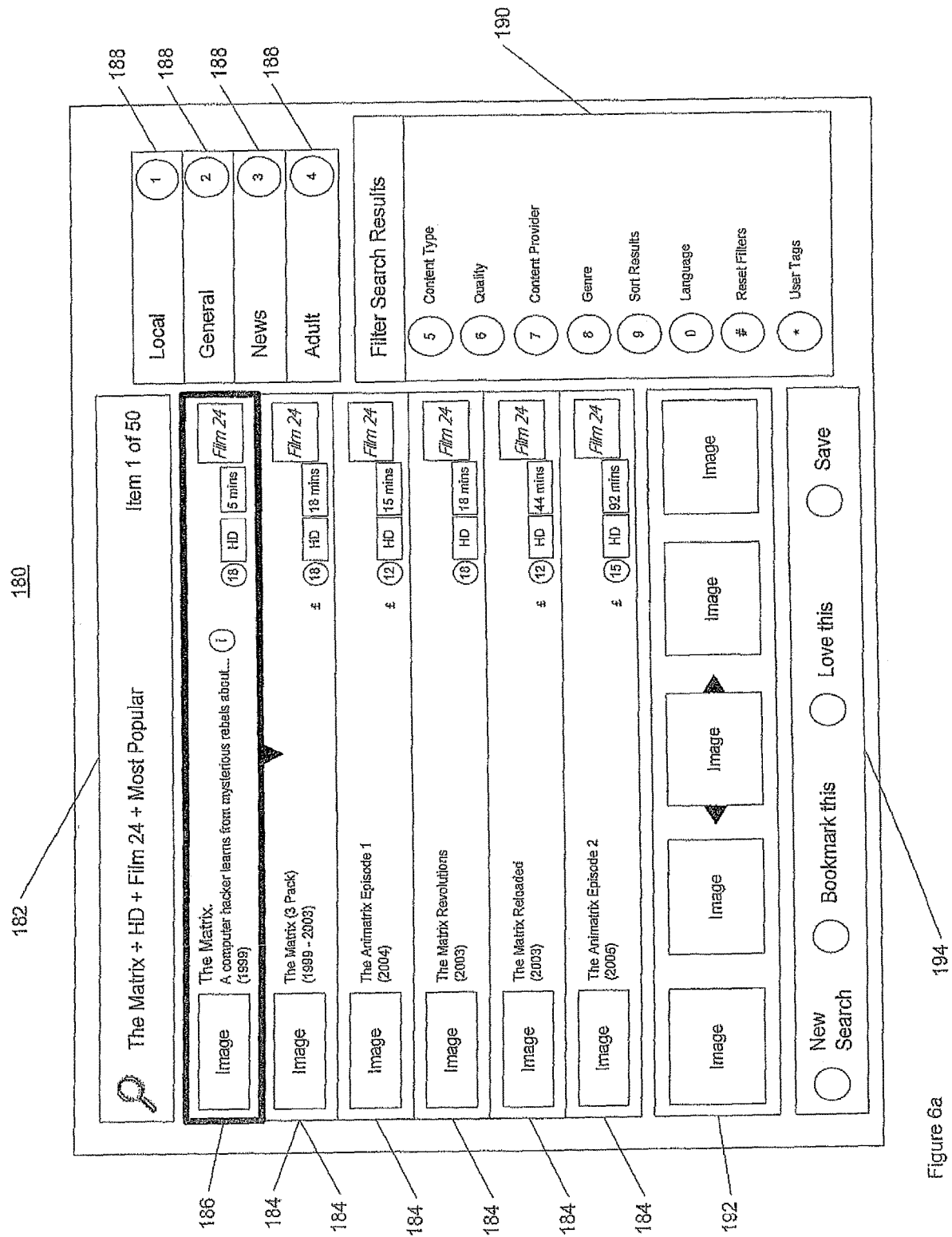
FIGS. 6a and 6b show screenshots of a screen displayed by the content navigation module of FIG. 5, to show results of a search invoked by the user.
Figure 6B:
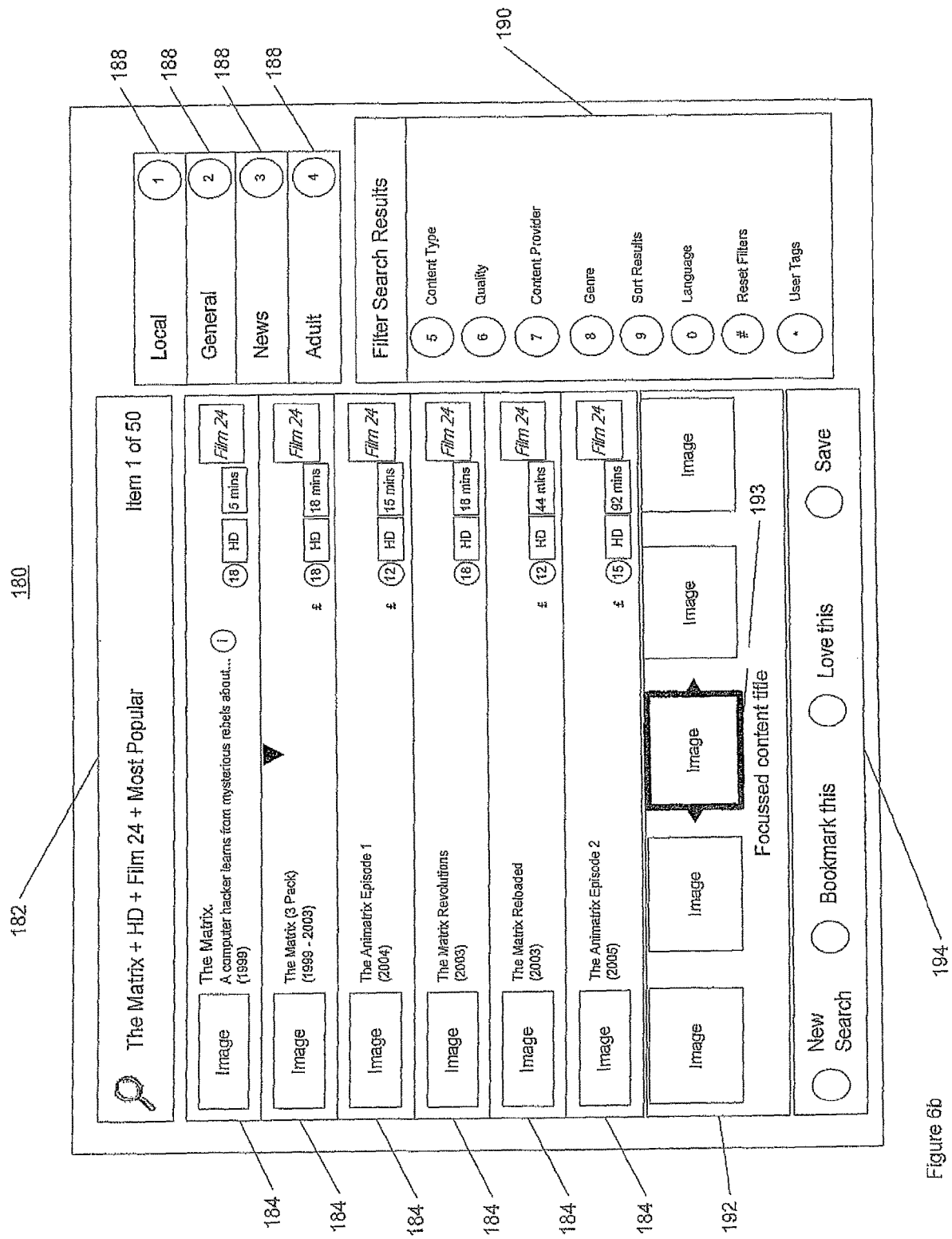

FIGS. 6*a* and 6*b* show screenshots 180 of an example search results screen displayed by the content navigation module to show results of a search invoked by the user. The exact layout, functionality and branding of this screen would be determined by the OEM, operator and content owner configurations as well as user preference configurations.

The search results screen of the content navigation module contains a search term field 182, a list of content identifier items 184, a cursor 186 (shown in FIG. 6*a* but not in FIG. 6*b*), categories under which the search results were found 188, filtering options 190, an associated content list 192, an associated content list cursor 193 (shown in FIG. 6*b* but not in FIG. 6*a*) and an options field 194.

The search terms entered by the user of the content receiver using the content navigation module described above in relation to FIG. 5 are displayed in the search term field 182. The user has the option of using search filters selected from the filtering options 190 to refine their search results and, in doing so, each selected search filter will be populated alongside the search terms entered by the user. Thus a search modified from the user's initially entered search terms may appear in the form "Search name+$1^{st}$ filter applied+$2^{nd}$ filter applied" and which modified search term is then used to obtain updated search results from a content feed.

The filtering options 190 are arranged as a list of category refinements, e.g. Content Type (such as Music, Movies, User generated content, TV programmes), Quality, Content Provider, Genre, Sort results, Language, User tagged content, and Reset all filters. A number may be displayed against each category refinement and to which a correspondingly numbered key on a remote control of the content receiver will, when pressed, invoke the display of a host of sub-categories related to the selected category to allow the user to further refine the search results.

In the illustrated example of FIGS. 6a and 6b, if the user presses the "6" key for the "Quality" category, the filter list changes to show sub categories such as High Definition (HD), Standard Definition (SD), and both HD and SD. If, for example, the user selects the HD sub-category, an indication is displayed adjacent the "Quality" filtering option on the main category refinements list of filtering options 190 to indicate that there is category refinement under the "Quality" filtering option. The search term field 182 is updated to include "HD" in the modified search term.

The list of content identifier items 184 comprises a vertical list of identifier items relating to content found through the search. As a default, the identifier items are arranged with the most relevant identifier items at the top of the list. The content identifier items provide at least a name of the content (e.g. Title) and serve as links to the content they identify. Thus, if a user selects a particular content identifier item, the content will then be displayed to the user. An input command received by the user input is communicated to the CPU 141 which determines if the requested content is available via the broadcast video distribution network or the communication network. If available via the broadcast video distribution network, the CPU 141 sends a control signal to the distribution receiver 142 to ensure that an appropriate gateway is open (e.g. correct TV channel selected) to receive the content at the content receiver. Additionally, the CPU 141 sends a notification to the content manager 116 of the MDMS 110 via the communications network that such content is being obtained. The content manager 116 communicates with the data storage module of the content owner configuration module 114 to locate appropriate parameters to be applied to the content and, upon location, transfers the same to the content receiver 108 via the communications network. Upon receipt of the content at the distribution receiver 142 of the content receiver 108, the content passes to the video decoder which applies the parameters received from the MDMS 110 to the content.

If the content is available via the communication network, a content request is sent by the CPU 141 via the network interface 146 to the communication network 104 for transmission to the MDMS 110. Upon receipt of the request, the network interface 112 transfers the request to the content manager 116 which acquires location data (e.g. a URL) of the requested content from the content indexer 118 (via the content owner configuration module 114) and returns the location data of the content source via the communications network 104 to the content receiver 108. The CPU 141 upon receipt of the location data then requests the content from a content source using the location data.

Cursor 186 (as illustrated in FIG. 6a, but not FIG. 6b) comprises a movable indication feature which highlights one content identifier item in the list of content identifier items 184. The cursor is movable vertically from a first position where a first content identifier item is highlighted to a second adjacent position where a second content identifier item is highlighted responsive to user input via the remote control (e.g. Up/Down keys of the remote control).

When the cursor 186 is located over a content identifier item, the highlighted item may be enlarged (compared with other content identifier items in the list of content identifier items 184) and/or gain a border. Additionally, further information relating to the content may be displayed within the content identifier item (e.g. Quality (HD/SD), Premium Icon (to indicate that payment is required to view the content), age certificate icon, a content owner logo, content length, whether the content is broadcast video or Internet video content, and one line synopsis of content).

The content identifier items may comprise one or more of: image data; video data; and text data. The image data may comprise images and/or icons in a particular format e.g. JPEG.

The cursor 186 may also comprise a directional indicator to indicate to a user that the list can be navigated using Up/Down arrows of the remote control. If the cursor is positioned over the first item in the list only a down indicator should be visible and, likewise, if the cursor is positioned over the last item in the list, only an up indicator should be visible.

The, categories under which the search results were found 188 may include categories such as "Local", "General", "News" and "Adult". A number associated with each category indicates the number of content items found in the search under that particular category. The actual categories displayed may be dynamically determined by the MDMS based on the results listed.

Associated content list 192 comprises a horizontal list arranged below the list of content identifier items 184, and which includes content items associated with the content identifier item currently highlighted in the list of content identifier items 184. The associated content list 192 is a dynamic list which changes as the content identifier item highlighted in the list of content identifier items 184 changes. The content identifier items of the associated content list 192 serve as links to the content they identify. Thus, if a user selects a particular content identifier item, the content will then be displayed to the user.

In the illustrated example, the content identifier items in the associated content list 192 are recommendations based upon the highlighted item in the list of content identifier items 184. Further, the associated content list is, in the illustrated example, in a carousel arrangement.

To access the associated content list 192 from a list of content identifier items 184 a user presses remote control keys having appropriate movement functions assigned thereto (e.g. Left/Right arrow keys) to move focus to the associated content list 192. In a particular arrangement, pressing a Left/Right arrow key once will shift focus to the associated content list 192, the list of content identifier items 184 will fade, the cursor 186 will disappear and the screen displayed will be that as illustrated in FIG. 6b. Pressing up/down arrow keys will shift focus back to the list of content identifier items 184, the associated content list 192 will fade and the screen will revert to the display illustrated in FIG. 6a.

Associated content list cursor 193 (illustrated in FIG. 6b but not 6a) only appears when focus is changed to the associated content list in the manner described above. The associated content list cursor 193 comprises a movable indication feature which highlights one associated content identifier item in the associated content list 192. The cursor is movable horizontally from a first position where a first associated content identifier item is highlighted to a second adjacent position where a second associated content identifier item is highlighted responsive to user input via the remote control (e.g. Left/Right keys of the remote control).

When the associated content list cursor 193 is located over a content identifier item, the highlighted item may be enlarged (compared with other associated content identifier items in the associated content list 192) and/or gain a border.

As a default option in a particular arrangement, the centre item of the associated content list 192 is the item highlighted by the associated content list cursor 193. Pressing the Left/Right keys rotates the carousel but the highlighted item remains in the centre, i.e. the cursor remains stationary at the centre of the associated content list 192 whilst the items move relative to it.

Additionally, further information relating to the associated content item currently highlighted may be displayed within the associated content identifier item (e.g. a content owner logo, one line synopsis of content).

The associated content list cursor 193 may also comprise a directional indicator to indicate to a user that the list can be navigated using Left/Right arrows of the remote control. In the illustrated example, the list is arranged in a carousel manner, and so both directions are indicated at all times.

The additional options field 194 presents further functions that can be performed. In the illustrated example screenshot 180 it is indicated that a particular key of the remote control having an appropriate function assigned thereto (e.g. Red key) should be pressed to perform a new search, and a different key of the remote control having an appropriate function assigned thereto (e.g. Green key) should be pressed to allow the user to bookmark the highlighted item in the list. Further options might include the illustrated functions of a rating function (e.g. "Love this") and "Save". The "Love this" function allows a user to rate the highlighted item in the list by pressing a Yellow key of the remote control and the "Save" function allows the user to save the search results by pressing the Blue key of the remote control.

Content items in the list may optionally display a number of relevant focusable content sub-items arranged vertically, for example, options to play SD or HD and to remove the item from the list.

Figure 7:
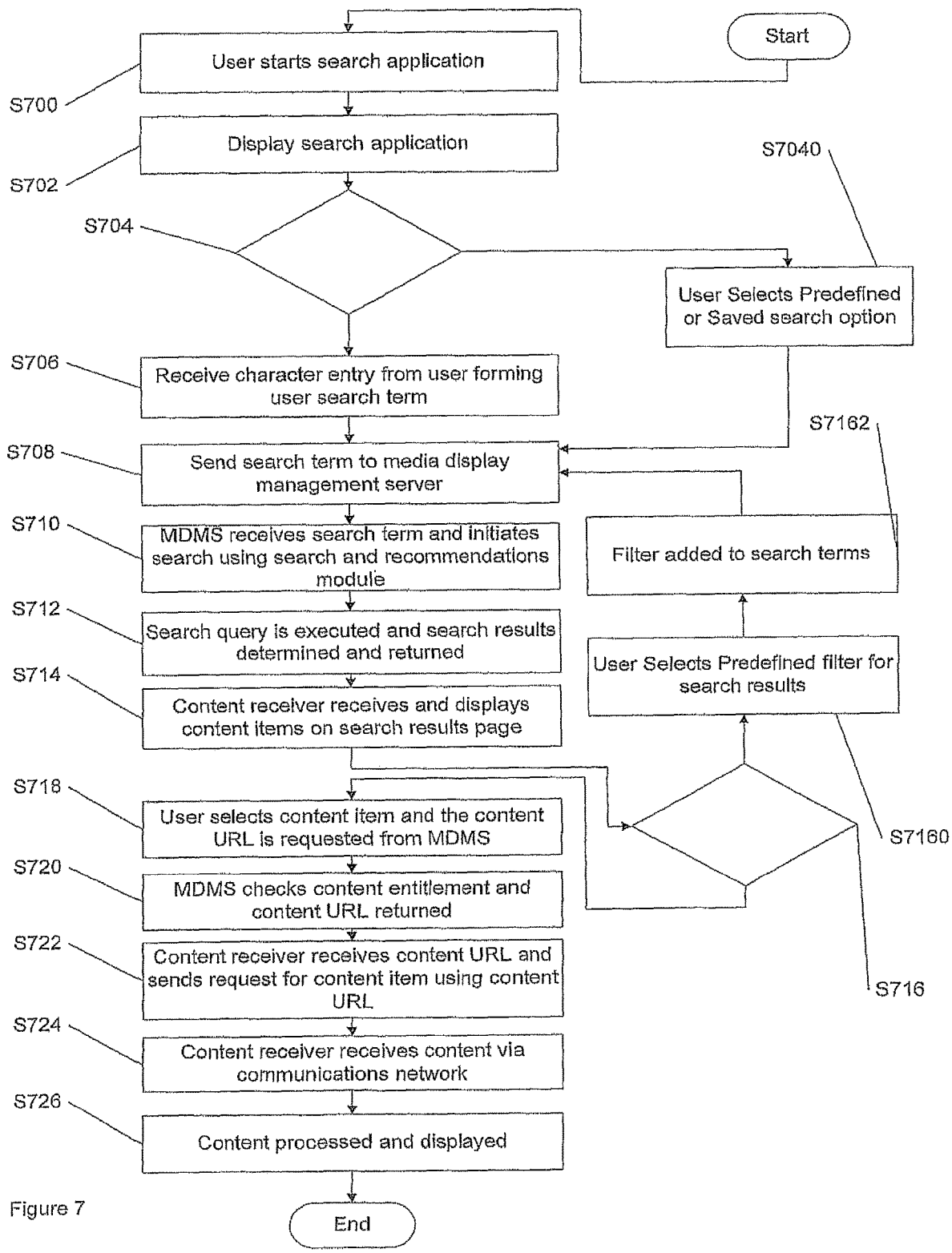
FIG. 7 is a process flow diagram illustrating steps carried out in order to provide access to additional content by means of a content navigation module.

FIG. 7 illustrates steps of a procedure in the content navigation module to provide access to additional content either during playback of content (e.g. video sequences) on a content receiver or from another application (e.g. from a content receiver menu, viewer menu or content provider menu).

If the user wishes to invoke a content navigation module, the user may initiate the content navigation module on the content receiver (S700), for example by pressing a button (such as a Red button) on an input device (e.g. remote control). When the content receiver accepts input from the user that indicates the content navigation module should be started, the content receiver contacts the MDMS 110 to indicate that a content navigation module has been invoked. Referring also to FIG. 4, the input receiver 150 forwards data to the MDMM 160 running on CPU 141 indicating that the content navigation module has been invoked. The CPU 141 sends a request for content navigation module display data to the network interface 146 for onward transmission to the MDMS 110 via communication network 104. The request is received in the network interface 112 of the MDMS 110 and forwarded to the content manager 116. The content manager 116 requests the content navigation module display data from the data storage module of the content owner configuration module 114 which locates such content navigation module display data and returns the same to the content manager 116. The content manager 116 passes the content navigation module display data to the network interface 112 for transmission via the communications network 104 to the content receiver 108. Such content navigation module display data is received at the network interface 146 of the content receiver 108 and then passed to the CPU 141 implementing MDMM 160. The MDMM 160 renders the specified content navigation module using the graphics processor 144. The graphics output is then forwarded to the content output 145 and the content navigation module is displayed on the content display 149 (S702). The content navigation module is displayed, for example by overlaying the graphics of the content navigation module over dynamic video content (e.g. either wholly or in a transparent format) or presenting the graphics of the content navigation module as a stand alone image without any content (dynamic or otherwise) behind. The content navigation module may also be presented in a box wrapped around the video (e.g. an L-shaped box) with the video content still playing.

At this point, the user can choose between entering characters themselves to form a search term, or selecting predefined or pre-saved search terms (S704). If a predefined search is selected from available options displayed on screen (S7040), the process jumps directly to the search for content (S710) described later. However, if a user chooses to enter search terms themselves, then these may be entered by the user using an available input device (e.g. remote control), the received characters forming a user search term (S706). Command data received at the input receiver 150 from the characters input via the input device 158 is forwarded to the CPU 141. Input character data is forwarded to the graphics processor 144 where the input character data is encoded and forwarded from the graphics processor 144 to the content output 145 to allow the content navigation module screen displayed on the content display 149 to be updated as characters are entered.

When character entry is complete and the search term has been compiled, the user indicates such and requests a search by entering a command through the input device 158. For example, inputting a control signal such as activating the "Run Search" user actuable icon. The MDMM 160 determines that the search has been requested and responds by forwarding the user search term data in a search request to the network interface 146 for onward transmission to the MDMS 110 via communication network 104 (S708). Network interface 112 of the MDMS 110 receives the request and forwards it to the content manager 116 which transfers the search term data to the search and recommendations module 122 to initiate a search (S710). The search and recommendations module runs the search query and retrieves the content item metadata for the search results and returns these to the content manager 116.

The content manager 116 then outputs the content item metadata to the network interface 112 for transmission via the communications network 104 to the content receiver 108 (S712). This data is received at the network interface 146 of the content receiver 108 and then passed to the CPU 141 running the MDMM 160 application which renders the search results in a search results page as previously described in relation to FIG. 6 using the graphics processor 144. The graphics output is then forwarded to the content output 145 and the content navigation module is displayed on the content display 149 (S714).

At this point, the user may wish to view an item of content returned in the search results or refine the search by indicating that search filters are to be applied (S716). If the user selects one or more search filters (S7160) to tailor the search as required (these are illustrated under reference numeral 190 in FIG. 5), these filter terms are added to the existing search terms (S7162) and the process returns to step 3710 in order for the search to be conducted again.

If no filtering is required, the user can select a content item to view (S718) by entering a command through the input device 158. When a view content request is entered through the input device 158, the CPU 141 is notified by the input receiver 150 that a request has been received to view content, CPU 141 proceeds to forward a request for the requested content in a content request to the network interface 146 for onward transmission to the MDMS 110 via communication network 104 (S718). The request is received in the network interface 112 of the MDMS 110 and forwarded to the content enforcement module 128 which checks the entitlement of the user and content receiver to view the content (as previously described) and returns the content URL to the MDMM 160 application on the content receiver 108 via the communication network 104 (S720). The MDMM application then makes a request to the content source specified in the content URL via the network interface 146 and communications network 104 (S722).

The content source receives the request for content and retrieves such content for return to the content receiver 108. The content is transmitted via the communications network 104 and received in the network interface 146 of the content receiver 108 (S724). This data is retrieved by the CPU 141 and then passed to the video decoder 143 and audio processor 1430. The video decoder 143 renders the content for display and the content is then passed to the content output 145 to allow the content to be displayed on the content display along with the audio output (S726).

In a particular arrangement, the list of content identifier items may be ordered by relevance depending on how closely the content item matches the search terms. The ordering may also relate to the user's profile, for example, based on age, language, or location.

In the above arrangement, when content is requested from a list of search results, the request for content is processed in the content enforcement gateway before being passed to the content source. However, when content enforcement is not required for a content item, the content URL could be included for each item in the search results so that the MDMM 160 does not have to query the MDMS 110 to determine the content URL.

Figure 8:
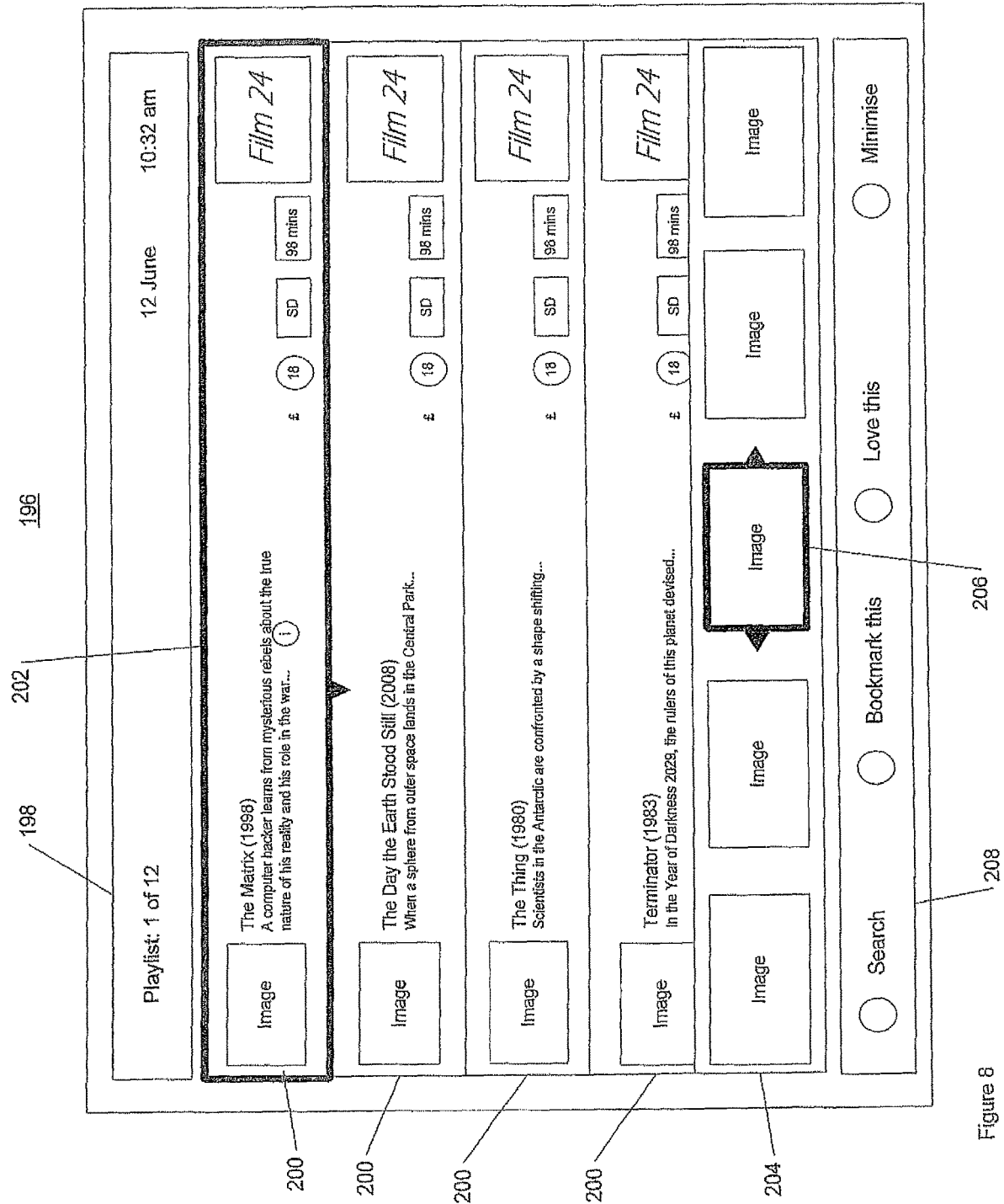
FIG. 8 shows a screenshot of a screen displayed by a playlist module in accordance with an embodiment of the invention when invoked by a user.

FIG. 8 shows a screenshot 196 of a screen displayed by a playlist module when invoked by a user. A playlist comprises a list of content identifier items 200 comprising links to content. The playlist is created by a user and is stored in the data storage module of MDMS 110.

The playlists screen of the playlist module contains a module identifier field 198, a list of content identifier items 200, a cursor 202, an associated content list 204, an associated content list cursor 206 and an options field 208.

The type of module (in this case "playlist") is displayed in the module identifier field 198.

The list of content identifier items 200 comprises a vertical list of identifier items relating to content in the playlist. The content identifier items provide at least a name of the content (e.g. Title) and serve as links to the content they identify. Thus, if a user selects a particular content identifier item, the content will then be displayed to the user using processes in a similar manner as described above.

Cursor 202 comprises a movable indication feature which highlights one content identifier item in the list of content identifier items 200. The cursor is movable vertically from a first position where a first content identifier item is highlighted to a second adjacent position where a second content identifier item is highlighted responsive to user input via the remote control (e.g. Up/Down keys of the remote control).

When the cursor 202 is located over a content identifier item, the highlighted item may be enlarged (compared with other content identifier items in the list of content identifier items 200) and/or gain a border. Additionally, further information relating to the content may be displayed within the content identifier item (e.g. Quality (HD/SD), Premium Icon (to indicate that payment is required to view the content), age certificate icon, a content owner logo, content length, and one line synopsis of content).

The content identifier items may comprise one or more of: image data; video data; and text data. The image data may comprise images and/or icons in a particular format e.g. JPEG.

The cursor 202 may also comprise a directional indicator to indicate to a user that the list can be navigated using Up/Down arrows of the remote control. If the cursor is positioned over the first item in the list only a down indicator should be visible and, likewise, if the cursor is positioned over the last item in the list, only an up indicator should be visible.

Associated content list 204 comprises a horizontal list arranged below the list of content identifier items 200, and which includes content items associated with the content identifier item currently highlighted in the list of content identifier items 200. The associated content list 204 is a dynamic list which changes as the content identifier item highlighted in the list of content identifier items 200 changes. The content identifier items of the associated content list 204 serve as links to the content they identify. Thus, if a user selects a particular content identifier item, the content will then be displayed to the user.

In the illustrated example, the content identifier items 200 in the associated content list 204 are recommendations based upon the highlighted item in the list of content identifier items 200. Further, the associated content list is, in the illustrated example, in a carousel arrangement.

To access the associated content list 204 from a list of content identifier items 200 a user presses keys of a remote control having appropriate movement functions assigned thereto (e.g. Left/Right arrow keys) to move focus to the associated content list 204. In a particular arrangement, pressing a Left/Right arrow key once will shift focus to the associated content list 204 and the list of content identifier items 200 will fade, and pressing up/down arrow keys will shift focus back to the list of content identifier items 200 and the associated content list 204 will fade.

Associated content list cursor 206 comprises a movable indication feature which highlights one associated content identifier item in the associated content list 204. The cursor is movable horizontally from a first position where a first associated content identifier item is highlighted to a second adjacent position where a second associated content identifier item is highlighted responsive to user input via the remote control (e.g. Left/Right keys of the remote control).

When the associated content list cursor 206 is located over a content identifier item, the highlighted item may be enlarged (compared with other associated content identifier items in the associated content list 204) and/or gain a border. As a default option in a particular arrangement, the centre item of the associated content list 204 is the item highlighted by the associated content list cursor 206. Pressing the Left/Right keys rotates the carousel but the highlighted item remains in the centre, i.e. the cursor remains stationary at the centre of the associated content list 204 whilst the items move relative to it.

Additionally, further information relating to the associated content item currently highlighted may be displayed within the associated content identifier item (e.g. a content owner logo, one line synopsis of content).

The associated content list cursor 206 may also comprise a directional indicator to indicate to a user that the list can be navigated using Left/Right arrows of the remote control. In the illustrated example, the list is arranged in a carousel manner, and so both directions are indicated at all times.

Although FIG. 8 illustrates cursor 202 and associated content list cursor 206 present at the same time, this need not be the case. Indeed, in an optional arrangement, when focus is on list of content identifier items 200, then only the cursor 202 is displayed. However, when focus changes to the associated content list 204, the cursor 202 disappears and the associated content list cursor 206 appears around an item in the associated content list 204. When focus changes back to the list of content identifier items 200, the cursor 202 reappears and the associated content list cursor 206 disappears. This arrangement is similar to that described in relation to FIGS. 6*a* and 6*b*.

The additional options field 208 presents further functions that can be performed. In the illustrated example screenshot 180 it is indicated that a particular key of the remote control having an appropriate function assigned thereto (e.g. Red key) should be pressed to perform a search, and a different key of the remote control having an appropriate function assigned thereto (e.g. Green key) should be pressed to allow the user to bookmark the highlighted item in the list. Further options might include the illustrated functions of "Love this" and "Save". The "Love this" function allows a user to rate the highlighted item in the list by pressing a Yellow key of the remote control and the "Save" function allows the user to save the search results by pressing the Blue key of the remote control.

FIG. 9 shows a screenshot 210 of a screen displayed by a TV guide module when invoked by a user.

The TV guide screen of the TV guide module contains an information field 212, a list of TV programme content identifier items 214, a cursor 216, an associated content list 218, an associated content list cursor 220 and an options field 222.

The information field 212 displays, for example, the viewer logged in at the content receiver, a number of the viewer's friends currently online versus a total number of friends, a number of unread messages in the viewer's inbox, and a current date and time.

The list of TV programme content identifier items 214 comprises a vertical list of identifier items relating to content being broadcast in relation to the channel currently being viewed. In a particular example, the current programme is shown along with subsequent programmes on that channel. As will be appreciated, there is no point in showing previous programmes in a linear broadcast environment, unless "catch-up" services are available via the communications network or PVR services since the opportunity to view previous programmes has passed. The content identifier items 214 provide at least a name of the content (e.g. programme title) and serve as links to the content they identify. Thus, if a user selects a particular content identifier item 214, the content will then be displayed to the user using processes in a similar manner as described above. The content identifier items 214 may further include metadata providing a synopsis of the programme, a content owner logo, an information icon, and a start time (if the programme has not yet started).

Cursor 216 comprises a movable indication or pointer feature which highlights one content identifier item 214 in the list of TV programme content identifier items 214. The cursor 216 is movable vertically from a first position where a first content identifier item is highlighted to a second adjacent position where a second content identifier item is highlighted responsive to user input via the remote control (e.g. Up/Down keys of the remote control).

When the cursor 216 is located over a content identifier item, the highlighted item may be enlarged (compared with other content identifier items in the list of content identifier items 200) and/or gain a border.

The content identifier items 214 may comprise one or more of: image data; video data; and text data. The image data may comprise images and/or icons in a particular format e.g. JPEG.

The cursor 216 may also comprise a directional indicator to indicate to a user that the list can be navigated using Up/Down arrows of the remote control. If the cursor is positioned over the first item in the list only a down indicator should be visible and, likewise, if the cursor is positioned over the last item in the list, only an up indicator should be visible.

Associated content list 218 comprises a horizontal list arranged below the list of TV programme content (or online media content (depending on the configuration)) identifier items 214, and which includes content items associated with the content identifier item currently highlighted in the list of TV programme content identifier items 214. The associated content list 218 is a dynamic list which changes as the content identifier item highlighted in the list of TV programme content identifier items 214 changes. Depending on the configuration (OEM, Operator or Content Owner (broadcaster), the content identifier items 214 could relate to "catch-up" TV items, online content items from one or more pre-defined sources, related broadcast shows or channels from the same broadcaster). The content identifier items of the associated content list 218 serve as links to the content they identify. Thus, if a user selects a particular content identifier item, the content will then be displayed to the user.

In the illustrated example, the content identifier items in the associated content list 218 are recommendations based upon the highlighted item in the list of TV programme content identifier items 214. Further, the associated content list is, in the illustrated example, in a carousel arrangement.

To access the associated content list 218 from a list of TV programme content identifier items 214 a user presses remote control keys having appropriate movement functions assigned thereto (e.g. Left/Right arrow keys) to move focus to the associated content list 218. In a particular arrangement, pressing a Left/Right arrow key once will shift focus to the associated content list 218 and the list of content identifier items 214 will fade, and pressing up/down arrow keys will shift focus back to the list of TV programme content identifier items 214 and the associated content list 218 will fade.

Associated content list cursor 220 comprises a movable indication feature which highlights one associated content identifier item in the associated content list 218. The cursor 216 is movable horizontally from a first position where a first associated content identifier item is highlighted to a second adjacent position where a second associated content identifier item is highlighted responsive to user input via the remote control (e.g. Left/Right keys of the remote control).

When the associated content list cursor 220 is located over a content identifier item, the highlighted item may be enlarged, or display another pre-programmed visual effect (for example a video thumb-nail) depending on the device capabilities, and OEM, operator or content owner configuration (compared with other associated content identifier items in the associated content list 218) and/or gain a border. As a default option in a particular arrangement, the centre item of the associated content list 218 is the item highlighted by the associated content list cursor 220. Pressing the Left/Right keys rotates the carousel but the highlighted item remains in the centre, i.e. the cursor remains stationary at the centre of the associated content list 218 whilst the items move relative to it.

Additionally, further meta-data information relating to the associated content item currently highlighted may be displayed within the associated content identifier item (e.g. a content owner logo, one line synopsis of content).

The associated content list cursor 220 may also comprise a directional indicator to indicate to a user that the list can be navigated using Left/Right arrows of the remote control. In the illustrated example, the list is arranged in a carousel manner, and so both directions are indicated at all times.

Although FIG. 9 illustrates cursor 216 and associated content list cursor 220 present at the same time, this need not be the case. Indeed, in an optional arrangement, when focus is on list of content identifier items 214, then only the cursor 216 is displayed. However, when focus changes to the associated content list 218, the cursor 214 disappears and the associated content list cursor 220 appears around an item in the associated content list 218. When focus changes back to the list of content identifier items 214, the cursor 216 reappears and the associated content list cursor 220 disappears. This arrangement is similar to that described in relation to FIGS. 6a, 6b and 8.

The additional options field 222 presents further functions that can be performed. In the illustrated example screenshot 210 it is indicated that a particular key of the remote control having an appropriate function assigned thereto (e.g. Red key) should be pressed to perform a search.

The particular functions available (for example, "record", "bookmark", "share" or "download"), will depend on the device's capabilities and the OEM, operator or content owner preferences.

Although described in relation to a TV programme guide, the arrangement of FIG. 9 may also be applicable as a content guide for content received via the communications network rather than broadcast content.

The above one or more embodiments are to be understood as illustrative examples of the invention. Further embodiments of the invention are envisaged as follows.

In one or more embodiments of the invention content distribution is via transmission over both a communications network (as either streaming video or as a progressive download) and a video distribution network (as broadcast video). The communications network may be for example the Internet or a local private network, a wireless network, or a telecommunications network such as for example General Packet Radio Service (GPRS) or a telecommunications network based on a Third Generation (3G) telecommunications standard such as for example the Universal Mobile Telecommunications System (UMTS) or Code Division Multiple Access 2000 (CDMA2000) and the distribution receiver receives the transmission via a communications network, for example a network card, or a broadband modem, or a wireless network card, or a telecommunications receiver such as a GPRS receiver or a receiver based on a Third Generation (3G) telecommunications standard such as for example the Universal Mobile Telecommunications System (UTMS) or Code Division Multiple Access 2000 (CDMA2000).

In one or more embodiments of the invention content distribution technique may be via a storage medium for example a hard disc, or an optical storage medium such as a Digital Versatile Disc (DVD) or a High Definition DVD (HD-DVD) such as a Blue Ray Disc, and the content receiver is a device for accessing the storage medium, such as a hard disc or a DVD player or an HD-DVD player.

In one or more embodiments of the invention content distribution may be via a user-recorded storage medium, such as a hard disc or a Video Home System (VHS) cassette or for example an optical storage medium such as a Digital Versatile Disc (DVD) or a High Definition DVD (HD-DVD) such as a Blue Ray Disc, and the content receiver is a device for accessing the user recorded storage medium, such as means for accessing a hard disc or a VHS cassette player or a DVD player or an HD-DVD player.

In one or more embodiments of the invention content distribution may be via a user-recorded storage medium that is internal to the content receiver.

In one or more embodiments of the invention content distribution may be via a user-recorded storage medium that is external to and coupled with the content receiver.

In one or more embodiments of the invention content distribution may be via a user-recorded storage medium at a remote location and includes transmission to the content receiver via a communications network such as for example the Internet.

In one or more embodiments of the invention content distribution may be via an analogue broadcast.

In one or more embodiments of the invention content distribution may be via a digital broadcast.

In one or more embodiments of the invention content distribution may be via terrestrial television broadcast and the content receiver is a terrestrial television receiver.

In one or more embodiments of the invention content distribution may be via satellite television broadcast and the content receiver is a satellite television receiver.

In one or more embodiments of the invention content distribution may be via cable television broadcast and the content receiver is a cable television receiver.

In one or more embodiments of the invention, the content receiver may be configured to specify its capabilities to the MDMS, for example, each time search request is invoked, and/or when a request for content is sent to the MDMS.

In one or more embodiments of the invention the content receiver may be a computer, or content stored on a computer on a home network.

In one or more embodiments of the invention the content receiver may be a mobile device such as for example a portable computer, a mobile phone or another receiver of Digital Video Broadcast for Handheld devices (DVB-H).

In one or more embodiments of the invention the content display may be a visual display unit such as a computer monitor.

In one or more embodiments of the invention the content display may be a screen embedded in a mobile device.

In one or more embodiments of the invention the content navigation module may be invoked via the user selection of a menu item displayed by the video receiver.

In one or more embodiments of the invention the content navigation module and the browser application may be components of a single computer program.

In one or more embodiments of the invention the content navigation module may be implemented as dynamically generated content presented by the content receiver, for example where the dynamically generated content is a web page in a markup language such as for example Hypertext Markup Language (HTML).

In one or more embodiments of the invention the content navigation module may be implemented as dynamically generated content presented by the browser application that is generated by a remote system and transmitted to the browser application via a communications network.

In one or more embodiments of the invention the content receiver may be able to render items of content relating to TV applications described in a markup language or other Interactive engine such as for example Hypertext Markup Language (HTML), TV Markup Language (TVML, or wTVML), Extensible HTML (XHTML), XHTML Basic, CE-HTML or another Extensible Markup Language (XML) based content description.

In one or more embodiments of the invention the browser application may be able to render content in the form of a video sequence such as for example a video received via a communications network or a video distributed via a broadcast method received by the content receiver or a video stored on a storage medium accessed by the content receiver.

In one or more embodiments of the invention the search function comprises a sub-image embedded in content.

In one or more embodiments of the invention the input device may be a keypad on a mobile device, for example a keypad on a mobile phone.

In one or more embodiments of the invention the link to content may be a Universal Resource Identifier (URI).

In one or more embodiments of the invention the link to content may direct the content receiver to access content that is for example a video sequence that is for example received via a communications network or distributed via a broadcast method or stored on a storage medium, or a TV application capable of being accessed via an Interactive content engine installed on the device.

In one or more embodiments of the invention, the links to content may be paid-for interactive or video advertisements.

In one or more embodiments of the invention the content output component may be able to present a video sequence decoded by the video decoder in one portion of the video display and graphics produced by programs running on the graphics processor in another portion of the display.

In one or more embodiments of the invention the content output component may be able to present graphics produced by programs running on the graphics processor that consume the entire display.

In one or more embodiments of the invention the content output component produces an analogue computer display signal such as a Video Graphics Array (VGA) signal.

In one or more embodiments of the invention the video output component produces a digital display signal such as a Digital Visual Interface (DVI) signal.

In one or more embodiments of the invention the video output component produces a high-definition digital display signal such as a High-Definition Multimedia Interface (HDMI) signal.

In one or more embodiments of the invention, there is provided a communications system, comprising: one or more communications networks; a plurality of content items accessible over said one or more communications networks; and a data store of presentation configuration data for one or more of said plurality of content items for defining presentation of a content item corresponding to presentation configuration data.

In one or more embodiments of the invention, the communications system further comprises a content item representation configuration module operative to define representation of a content item in dependence on presentation configuration data corresponding to said content item.

In one or more embodiments of the invention, the communications system further comprises a content item receiver operative to access said plurality of content items over said one or more communications networks, wherein said content item representation configuration module is operative to define representation of a content item according to said presentation configuration data responsive to said content item receiver accessing said content item.

In one or more embodiments of the invention, the communications system further comprises a display device and wherein said content item receiver is operative to drive said display device to display said content item in accordance with said presentation configuration data.

In one or more embodiments of the invention a one of said one or more communications networks is a broadcast communications network and said presentation configuration data comprises broadcast communications network display data for displaying indicia associated with said broadcast communications network.

In one or more embodiments of the invention the content item representation configuration module is further operative to define representation of a content item in dependence on a state of the content item receiver and presentation configuration data stored in the data store corresponding to that state.

In one or more embodiments of the invention the state of said content item receiver is indicative of said content item receiver being tuned to receive a communication from said broadcast communications network.

In one or more embodiments of the invention the presentation configuration data comprises content item owner presentation configuration data usable by said content item receiver for displaying indicia associated with said content item owner.

In one or more embodiments of the invention the presentation configuration data comprises original equipment manufacturer (OEM) configuration data usable by said content item receiver for displaying indicia associated with the manufacturer of the content item receiver.

In one or more embodiments of the invention the content item representation configuration module is operative to transmit content item configuration data to said content item receiver.

In one or more embodiments of the invention the a further one of said one or more communications network is a broadband network.

In one or more embodiments of the invention a content item accessible over said broadband network comprises a broadband content item.

In one or more embodiments of the invention the presentation configuration data for said broadband content item comprises presentation configuration data usable by said content item receiver for displaying indicia associated with a source and/or originator of said broadband content item.

In one or more embodiments of the invention a yet further one of said one or more communications network is a local area network.

In one or more embodiments of the invention the data store is accessible by one or more of content owners, OEMs, broadband service providers and/or broadcast service providers for configuring said data store with presentation configuration data.

In one or more embodiments of the invention the communication system further comprises an interface operative to provide a communications conduit to said data store for said one or more content owners, OEMs, broadband service providers and/or broadcast service providers for configuring said data store with presentation configuration data.

In one or more embodiments of the invention the interface comprises a network interface thereby to provide said content item owners.

In one or more embodiments of the invention, there is provided a content item display management module, comprising: a data store of presentation configuration data for one or more of a plurality of content items; and a content item representation configuration module operative to define representation of a content item in dependence on presentation configuration data corresponding to said content item.

In one or more embodiments of the invention the presentation configuration data comprises broadcast communications network display data for displaying indicia associated with said broadcast communications network.

In one or more embodiments of the invention the presentation configuration data comprises content item owner configuration data usable by said content item receiver for displaying indicia associated with said content item owner.

In one or more embodiments of the invention the presentation configuration data comprises original equipment manufacturer (OEM) configuration data usable by a content item receiver for displaying indicia associated with the manufacturer of the content item receiver.

In one or more embodiments of the invention the content item representation configuration module is operative to transmit content item representation data to a content item receiver.

In one or more embodiments of the invention the content item display management module further comprises an interface operative to provide a communications conduit to said data store for said one or more content owners, OEMs, broadband service providers and/or broadcast service providers for configuring said data store with presentation configuration data.

In one or more embodiments of the invention, there is provided a content item receiver, configured to receive content item representation data and drive a display device to display indicia corresponding to said content item representation data.

In one or more embodiments of the invention the content item receiver is further configured to drive a display device to reserve one or more regions of said display for indicia corresponding to respective content item representation data.

In one or more embodiments of the invention the content item representation data corresponds to one or more of: a content provider; a content owner; a service provider; a broadcast network owner; and an OEM.

In one or more embodiments of the invention, there is provided a method of content item display management, comprising: storing presentation configuration data for one or more of a plurality of content items; and defining representation of a content item in dependence on presentation configuration data corresponding to said content item.

In one or more embodiments of the invention the method further comprises defining representation of a content item in dependence on a state of the content item receiver and said presentation configuration data.

In one or more embodiments of the invention the method further comprises using said content item owner configuration data usable in a content item receiver for displaying indicia associated with said content item owner.

In one or more embodiments of the invention the method further comprises transmitting content item representation data to a content item receiver.

In one or more embodiments of the invention, there is provided a method of operating a content item receiver, comprising receiving content item representation data and driving a display device to display indicia corresponding to said content item representation data.

In one or more embodiments of the invention the method of operating a content item receiver further comprises driving a display device to reserve one or more regions of said display for indicia corresponding to respective content item representation data.

In one or more embodiments of the invention the content item representation data corresponds to one or more of: a content provider; a content owner; a service provider; a broadcast network owner; and an OEM.

In one or more embodiments of the invention, there is provided a computer program comprising computer program element operative in a data processing apparatus to implement the content item display management module above and/or the content item receiver above and/or the method above.

In one or more embodiments of the invention, there is provided a carrier medium carrying the above computer program.

In one or more embodiments of the invention, there is provided a communications system, comprising: one or more communications networks; a plurality of content items accessible over said one or more communications networks; a plurality of content item receivers operative to access one or more of said plurality of content items over said one or more communications networks; a data store of configuration data for one or more of said plurality of content item receivers; a search module operative to identify one or more of said plurality of content items and corresponding metadata responsive to a search request from a one content item receiver of said plurality of content item receivers; and a content filter module operative to filter content items identified by said search module in dependence on configuration data corresponding to said one of said plurality of content item receivers to generate a list of content items.

In one or more embodiments of the invention the data store further includes configuration data for one or more of said plurality of content item owners and/or for one or more users of content item receivers.

In one or more embodiments of the invention the content filter module is further operative to filter content items identified by said search module in dependence on said configuration data for one or more of said plurality of content item owners and/or said configuration data for one or more users of content item receivers and/or said metadata.

In one or more embodiments of the invention the configuration data comprises information on one or more of: video decoders supported by said one content item receiver; bandwidth of communication channel with said one content item receiver; display format of a display device associated with said one content item receiver; display drivers supported by said one content item receiver; display limitations; policies; branding and rules determined by content item owners for the display of their content; personal preferences of users of the content item receivers; display limitations; and branding and functionality as determined by the responsible parties (manufacturers or operators) of the content item receivers, such that said list consists of identified content items usable by said one content item receiver.

In one or more embodiments of the invention the configuration data comprises information on a viewer profile corresponding to a user identity associated with said one content item receiver.

In one or more embodiments of the invention the configuration data comprises information enabling an on-screen user interface of the content item receiver to be generated or updated based on two or more of the configuration data.

In one or more embodiments of the invention the communication system further comprises a data store including a content item index.

In one or more embodiments of the invention the content item index further includes metadata associated with one or more indexed content items.

In one or more embodiments of the invention the search module is operative to search said content item index.

In one or more embodiments of the invention the search module is operative to order said list according to relevance to said search request.

In one or more embodiments of the invention the search module is further configured to identify one or more further content items associated with a content item corresponding to a specific content item identifier in said list to form a further list of content item identifiers.

In one or more embodiments of the invention the specific content item identifier is the first in said list.

In one or more embodiments of the invention the specific content item identifier is the first in said list.

In one or more embodiments of the invention the specific content item identifier is identified by user input received from one content item receiver.

In one or more embodiments of the invention the search module is configured to associate one or more further content items with a content item corresponding to a specific content item identifier in said list based on one or more of the following non-limiting list of metadata: genre; lead actor/actress; producer; topic; subject; distributor; channel owner and content item owner.

In one or more embodiments of the invention the search module is configured to associate one or more further content items with a content item corresponding to a specific content item identifier in said list based on recommendation rules in a viewer profile.

In one or more embodiments of the invention the communications system further comprises a network interface for communicating said list and said further list to said one content item receiver over said one or more communications networks.

In one or more embodiments of the invention, there is provided a method for identifying content items accessible by a plurality of content item receivers over one or more communications networks, comprising: identifying a plurality of content items and corresponding metadata responsive to a search request from a one content item receiver of said plurality of content item receivers; and filtering content items identified by said search module in dependence on configuration data corresponding to said one of said plurality of content item receivers to generate a list of content items.

In one or more embodiments of the invention the method further comprises filtering content items identified by said search module in dependence on said corresponding metadata.

In one or more embodiments of the invention the method further comprises searching a content item index.

In one or more embodiments of the invention the method further comprises ordering said list according to relevance to said search request.

In one or more embodiments of the invention the method further comprises identifying one or more further content items associated with a content item corresponding to a specific content item identifier in said list to form a further list of content item identifiers.

In one or more embodiments of the invention the method further comprises associating said one or more further content items with a content item corresponding to a specific content item identifier in said list based on one or more of the following non-limiting list of metadata: genre; lead actor/actress; producer; topic; subject; distributor; channel owner and content item owner.

In one or more embodiments of the invention the method further comprises associating said one or more further content items with a content item corresponding to a specific content item identifier in said list based on recommendation rules in said viewer profile.

In one or more embodiments of the invention the configuration data is used to generate actionable items on a user interface of the content item receiver.

In one or more embodiments of the invention the configuration data is used to determine the branding of parts or all of a user interface visible to the viewer from time to time.

In one or more embodiments of the invention the configuration data is used to determine the appropriate user interface behaviours on the content item receiver, for example from the following non-limiting list: on-focus scaling, focus transition effects, other focus highlighting options, item navigation policy, transparency, and appearance and disappearance visual effects of on screen items.

In one or more embodiments of the invention the configuration data is used to determine appropriate user interface actionable items, for example from the following non-limiting list: items on menus, items on sub menus, items as "colour button" accelerators, items as "numeric" accelerators.

In one or more embodiments of the invention there is provided a content item management module, comprising: a data store of configuration data for one or more of a plurality of content item receivers; a search module operative to identify one or more of a plurality of content items and corresponding metadata responsive to a search request from a one content item receiver of said plurality of content item receivers; and a content filter module operative to filter content items identified by said search module in dependence on configuration data corresponding to said one of said plurality of content item receivers to generate a list of content items.

In one or more embodiments of the invention there is provided a computer program comprising program elements operative in a data processing apparatus to implement the above method and/or the above content item management module.

In one or more embodiments of the invention there is provided a carrier medium carrying the above computer program.

It will be appreciated that the term "playback" is intended to refer to the display of live video content such as a live sporting event as well as recorded video content.

It is to be understood that any feature described in relation to any one embodiment may be used alone, or in combination with other features described, and may also be used in combination with one or more features of any other of the embodiments, or any combination of any other of the embodiments.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory. The computer program may be supplied from a remote source embodied in the communications medium such as an electronic signal, radio frequency carrier wave or optical carrier waves. Such carrier media are also envisaged as aspects of the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A method of content navigation using a computer program, a computer, and a display device, comprising:

receiving input character data;

determining, based on the input character data, a plurality of available content items from a first content domain, a second different content domain and a third further different content domain, the first content domain being a broadband content domain, the second content domain being a broadcast content domain, and the third content domain being a local content domain, wherein the determining available content items includes:

using user profile settings associated with a user, metadata associated with user activity, subscription information, device capability information, and geographical information in determining, thereby ensuring that each of the plurality of available content items is:

(1) relevant to the user;

(2) viewable by the user on the display device; and (3) in compliance with third party restrictions based on territory and content owner restrictions corresponding to each of the plurality of content items associated therewith, wherein the using the user profile settings includes amending the input character data to include one or more user profile settings as additional terms in the input character data prior to the determining the plurality of available content items;

displaying a list of the plurality of available content items on a user interface of the display device, wherein the list provides a synopsis of each of the plurality of available content items;

selecting from the list a particular one content item, wherein displaying the list of the plurality of available content items on the user interface comprises utilizing a graphics processor to update, one or more images displayed with the list as each input character data is received, wherein displaying the list of the plurality of available content items includes:

displaying the list of the plurality of available content items in a first portion of the user interface, displaying a second list of content items in a second portion of the user interface wherein the second list of content items includes content items that are related to the particular one content item, wherein the user interface displays the list of the plurality of available content items and the second list of content items simultaneously, and in response to the user changing a selection of the particular one content item to a second content item from the list of the plurality of available content items in the first portion of the user interface, automatically updating the second portion of the user interface with a third list of content items that includes content items related to the second content item; and selecting one of the second content item from the list of the plurality of available content items in the first portion of the user interface or a third content item from the third list of content items for viewing on the display device.

2. The method according to claim 1, wherein the synopsis of each content item indicates whether an additional charge will be necessary for viewing such content item.

3. The method according to claim 1 wherein each content item displayed in the list requires no additional charge for viewing such content item.

* * * * *